United States Patent [19]

Steinbergs et al.

[11] 4,218,592

[45] Aug. 19, 1980

[54] TELEPHONE ANALYZER FOR DETECTION OF CLANDESTINE DEVICES

[75] Inventors: Arvey Z. Steinbergs; Ray H. Taylor; James T. Whalen, all of Sunnyvale, Calif.

[73] Assignee: GTE Products Corporation, Stamford, Conn.

[21] Appl. No.: 624,115

[22] Filed: Mar. 14, 1967

[51] Int. Cl.² .............................................. H04M 3/26
[52] U.S. Cl. ........................ 179/175.2 D; 179/175.2 C
[58] Field of Search ............ 324/51, 57, 57 R, 57 PS; 179/175.2, 175.2 R, 175.2 C, 175.2 D

[56] References Cited

U.S. PATENT DOCUMENTS

| | | | |
|---|---|---|---|
| 2,835,751 | 5/1958 | Judy | 179/175.2 |
| 3,430,000 | 2/1969 | Rohrig | 179/175.2 C |
| 3,430,009 | 2/1969 | Fontaine | 179/175.1 R |

*Primary Examiner*—Howard A. Birmiel
*Attorney, Agent, or Firm*—John F. Lawler

[57] ABSTRACT

The apparatus is connected to the mounting cord of a subscriber telephone set and determines whether or not certain clandestine circuits or devices are connected across pairs of conductor lines in the mounting cord. The apparatus generates a pulse voltage and a holding signal which are applied to these lines in order to sustain conduction of breakdown devices, if any, that are connected across the lines. If detectors in the apparatus sense that the line impedance is between predetermined upper and lower limits equivalent to open and short circuits when the holding signal is applied, an indication is made that such circuits or devices are connected across the telephone lines.

10 Claims, 13 Drawing Figures

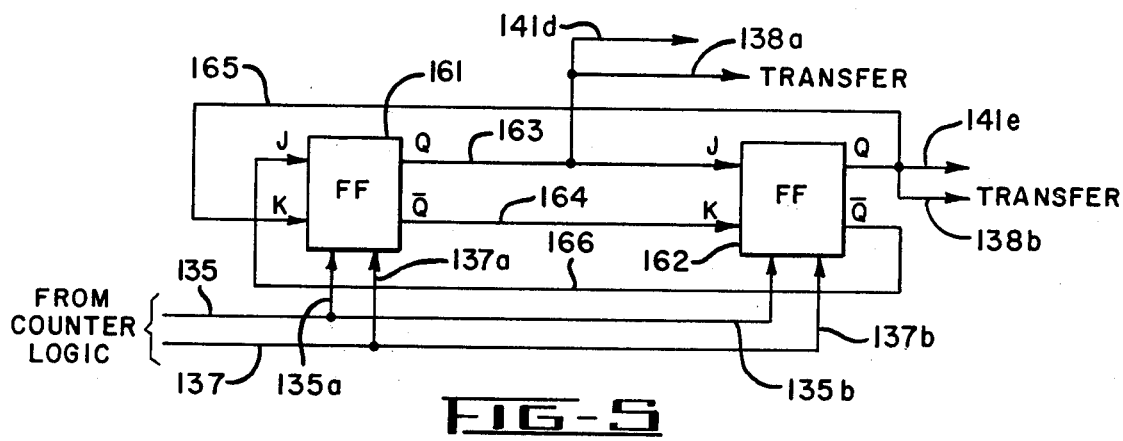
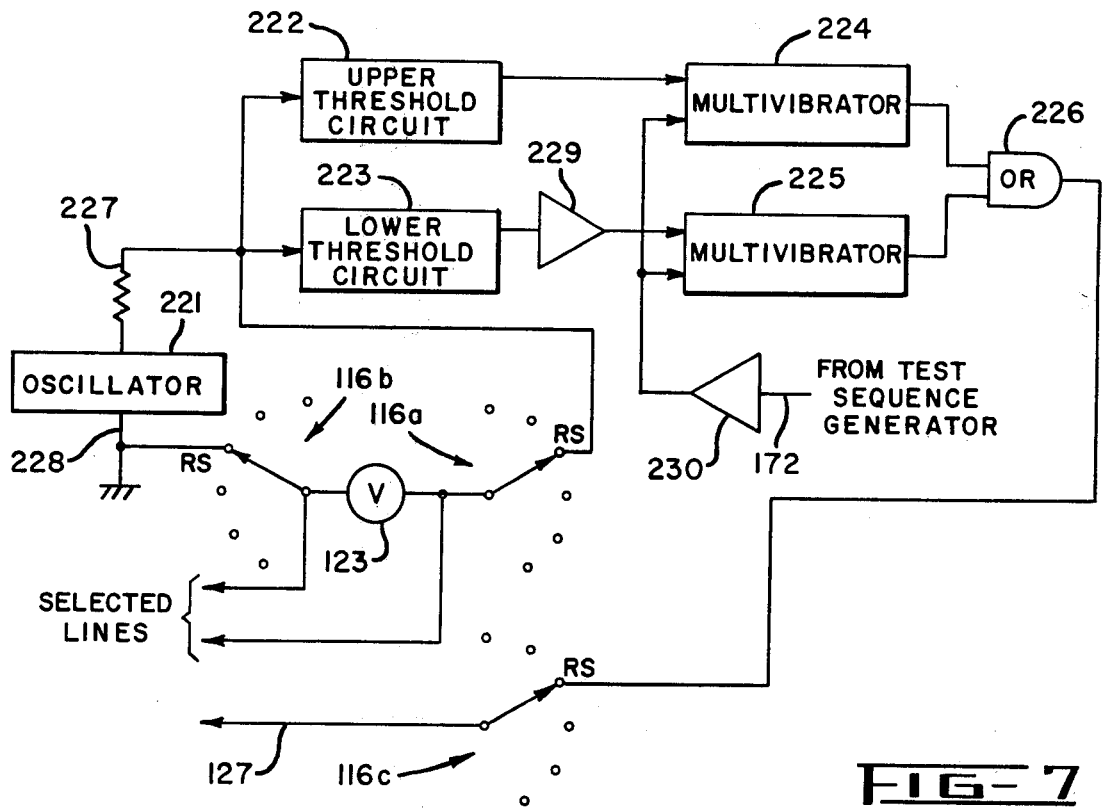
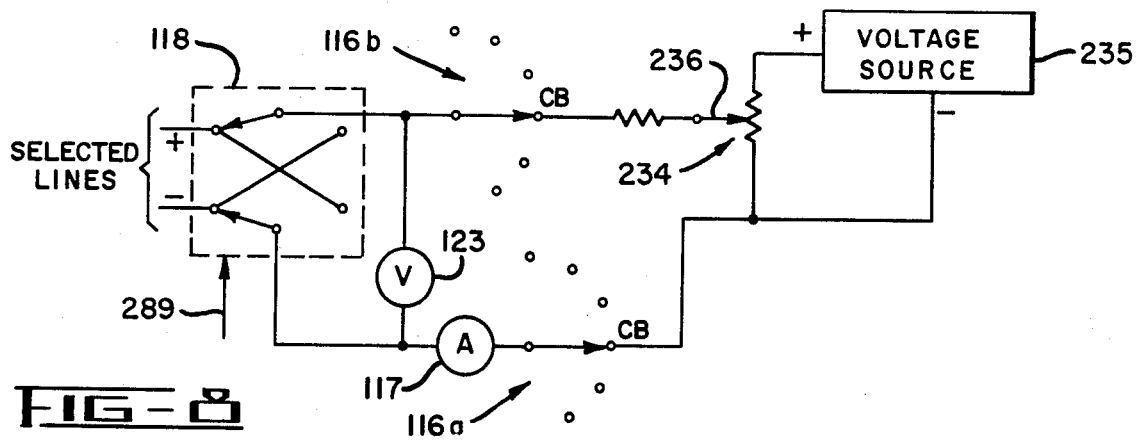

| ROW | J | K | $Q_{n+1}$ |
|---|---|---|---|
| 1 | 0 | 0 | $Q_n$ |
| 2 | 1 | 0 | 1 |
| 3 | 1 | 1 | $\bar{Q}_n$ |
| 4 | 0 | 1 | 0 |

TABLE 1

| ROW | CONDITION ON SELECTED LINES | THRESHOLD CIRCUIT | | MULTIVIBRATOR | | OR GATE 226 OUTPUT |
|---|---|---|---|---|---|---|
| | | 222 | 223 | 224 | 225 | |
| 1 | — | — | — | RESET | RESET | + |
| 2 | SHORT | OFF | OFF | RESET | RESET | + |
| 3 | OPEN | ON | ON | SET | SET | + |
| 4 | FAULT | OFF | ON | RESET | SET | — |

TABLE 5

| | COUNTER A | | RELAY TREE A | | LINE A | | | |
|---|---|---|---|---|---|---|---|---|
| | LINE | | RELAY | | RELAY TREE A CONDUCTORS | | | |
| ROW | 141d | 141d | 87a | 93a | 81a | 82a | 83a | 84a |
| 1 | 0 | 0 | D | D | 1 | | | |
| 2 | 1 | 0 | E | D | | 1 | | |
| 3 | 1 | 1 | E | E | | | 1 | |
| 4 | 0 | 1 | D | E | | | | 1 |

TABLE 2

| ROW | DETECTOR | CONDITION ON SELECTED LINES | DETECTOR OUTPUT | ASSOCIATED INVERTER OUTPUT |
|---|---|---|---|---|
| 1 | VOLTAGE DETECTOR 201 | SHORT | — | + |
| 2 | | OTHER | + | — |
| 3 | CURRENT DETECTOR 202 | OTHER | + | — |
| 4 | | OPEN | — | + |

TABLE 4A

| ROW | LINE | AND GATE 216 | |
|---|---|---|---|
| | | INPUT | OUTPUT |
| 1 | 217 | + | + |
| 2 | 219 | + | |
| 3 | 217 | — | + |
| 4 | 219 | + | |
| 5 | 217 | + | + |
| 6 | 219 | — | |
| 7 | 217 | — | — |
| 8 | 219 | — | |

TABLE 4B

| | | | | | COUNTER A | | COUNTER B | | RELAY TREE A | | RELAY TREE B | | LINE A RELAY TREE A | | | | LINE B RELAY TREE B | | | |
|---|---|---|---|---|---|---|---|---|---|---|---|---|---|---|---|---|---|---|---|---|
| | | PLUG | | RELAY COIL | LINE | | LINE | | RELAY COIL | | RELAY COIL | | LINE | | | | LINE | | | |
| | | | | 97 | 141d | 141e | 142d | 142e | 87a | 93a | 87b | 93b | 81a | 82a | 83a | 84a | 81b | 82b | 83b | 84b |
| COLUMN | 1 | 2 | 3 | 4 | 5 | 6 | 7 | 8 | 9 | 10 | 11 | 12 | 13 | 14 | 15 | 16 | 17 | 18 | 19 | |
| ROW | A | B | | | | | A-B SCAN | | | | | | | | | | | | | | |
| 1 | 1 | 1 | E | 0 | 0 | 0 | 0 | D | D | D | D | 1 | | | | 1 | | | |
| 2 | 1 | 2 | E | 0 | 0 | 1 | 0 | D | D | E | D | 1 | | | | | 1 | | |
| 3 | 1 | 3 | E | 0 | 0 | 1 | 1 | D | D | E | E | 1 | | | | | | 1 | |
| 4 | 1 | 4 | E | 0 | 0 | 0 | 1 | D | D | D | E | 1 | | | | | | | 1 |
| 5 | 2 | 1 | E | 1 | 0 | 0 | 0 | E | D | D | D | | 1 | | | 1 | | | |
| 6 | 2 | 2 | E | 1 | 0 | 1 | 0 | E | D | E | D | | 1 | | | | 1 | | |
| 7 | 2 | 3 | E | 1 | 0 | 1 | 1 | E | D | E | E | | 1 | | | | | 1 | |
| 8 | 2 | 4 | E | 1 | 0 | 0 | 1 | E | D | D | E | | 1 | | | | | | 1 |
| 9 | 3 | 1 | E | 1 | 1 | 0 | 0 | E | E | D | D | | | 1 | | 1 | | | |
| 10 | 3 | 2 | E | 1 | 1 | 1 | 0 | E | E | E | D | | | 1 | | | 1 | | |
| 11 | 3 | 3 | E | 1 | 1 | 1 | 1 | E | E | E | E | | | 1 | | | | 1 | |
| 12 | 3 | 4 | E | 1 | 1 | 0 | 1 | E | E | D | E | | | 1 | | | | | 1 |
| 13 | 4 | 1 | E | 0 | 1 | 0 | 0 | D | E | D | D | | | | 1 | 1 | | | |
| 14 | 4 | 2 | E | 0 | 1 | 1 | 0 | D | E | E | D | | | | 1 | | 1 | | |
| 15 | 4 | 3 | E | 0 | 1 | 1 | 1 | D | E | E | E | | | | 1 | | | 1 | |
| 16 | 4 | 4 | E | 0 | 1 | 0 | 1 | D | E | D | E | | | | 1 | | | | 1 |
| | A | A | | | | | A-A SCAN | | | | | | | | | 81a | 82a | 83a | 84a | |
| 17 | 1 | 2 | D | 0 | 0 | 1 | 0 | D | D | E | D | 1 | | | | | 1 | | |
| 18 | 1 | 3 | D | 0 | 0 | 1 | 1 | D | D | E | E | 1 | | | | | | 1 | |
| 19 | 1 | 4 | D | 0 | 0 | 0 | 1 | D | D | D | E | 1 | | | | | | | 1 |
| 20 | 2 | 3 | D | 1 | 0 | 1 | 1 | E | D | E | E | | 1 | | | | | 1 | |
| 21 | 2 | 4 | D | 1 | 0 | 0 | 1 | E | D | D | E | | 1 | | | | | | 1 |
| 22 | 3 | 4 | D | 1 | 1 | 0 | 1 | E | E | D | E | | | 1 | | | | | 1 |

TABLE 3

TELEPHONE ANALYZER FOR DETECTION OF CLANDESTINE DEVICES

BACKGROUND OF INVENTION (U)

This invention relates to test equipment and more particularly to equipment for analyzing a subscriber key telephone set for determining whether the set is modified to operate as a clandestine audio surveillance device.

The need for equipment to detect and identify clandestine surveillance devices located in offices and conference rooms and the like for monitoring conversations therein is evidenced by articles such as The Eavesdroppers, Electronic Design, June 21, 1966, pages 34–43. One readily available audio surveillance device is the conventional subscriber telephone set which can be modified to transmit conversations near the set even when the handpiece is in the cradle. The mounting cord of the simplest subscriber telephone set comprises only one pair of lines. The mounting cord of a subscriber key telephone set, however, may contain as many as 250 lines and thus several thousand different pairs of lines. An instrument for manually testing the conventional subscriber telephone set to determine whether it is an audio surveillance device comprises an ammeter, a voltmeter and a number of terminal posts to which DC voltage is applied. Each pair of lines in the mounting cord of the subscriber set is connected to terminal posts and is tested. The operator must observe and remember which lines have been tested and the associated readings on the ammeter and voltmeter and then decide whether the subscriber set is modified to operate as a surveillance device. It is not practical to use this test instrument for examining subscriber key sets because of the large number of different pairs of lines and the long period of time required to analyze each pair of lines. Such a test instrument cannot be used for detecting several different types of modification of subscriber sets.

An object of this invention is the provision of equipment for automatically selecting and testing pairs of lines of the mounting cord of a subscriber telephone set for detecting whether clandestine circuitry or devices are connected across the lines for converting the set into a clandestine audio surveillance device.

SUMMARY OF INVENTION (U)

Briefly, this invention comprises a connecting circuit coupled to the mounting cord of the subscriber telephone set under test and a test circuit. A scanner in the connecting circuit sequentially connects each pair of mounting cord lines to the test circuit. In one embodiment of the invention, the test circuit comprises a source of a high voltage pulse, a source of a holding signal and a circuit for measuring the impedance of the pair of lines under test. The high voltage pulse and the holding signal are applied to the pair of lines to cause and sustain conduction of any breakdown devices connected across the lines. The duration of the holding signal is greater than the width of the voltage pulse. The impedance of the lines is measured only during application of the holding signal to the lines. If the line impedance is greater than an upper limit or less than a lower limit, the output of the test circuit causes the scanner to connect a different pair of lines to the test circuit for test. If the line impedance is greater than the lower limit and less than the upper limit, the output of the test circuit causes the scanner to hold the lines under test and indicates that a clandestine circuit or device is connected across the pair of lines under test.

In another embodiment of the invention, the test circuit comprises an audio oscillator for externally illuminating the subscriber telephone set under test, i.e., acoustic waves generated by the oscillator are bounced off the outer surfaces of the set, and a threshold circuit connected to the outputs of the scanner. Transducers located in the subscriber telephone set convert the audio signals to electrical energy on the associated lines of the mounting cord. If an audio signal is not detected on the lines by the threshold circuit, the output of the test circuit causes the scanner to connect a different pair of lines to the test circuit for repetition of the test. If an audio signal having a magnitude greater than an upper limit of the threshold circuit is detected on the lines, the output of the test circuit causes the scanner to hold the lines under test and indicates that a transducer is connected to the lines.

DESCRIPTION OF DRAWINGS (U)

This invention will be more fully understood from the following detailed description of a preferred embodiment thereof, together with the accompanying drawings in which:

FIG. 5 is a schematic block diagram of a counter;

FIG. 7 is a schematic block diagram of the ringer search test circuit;

FIG. 8 is a schematic block diagram of the capacitor breakdown test circuit;

Figure 6:
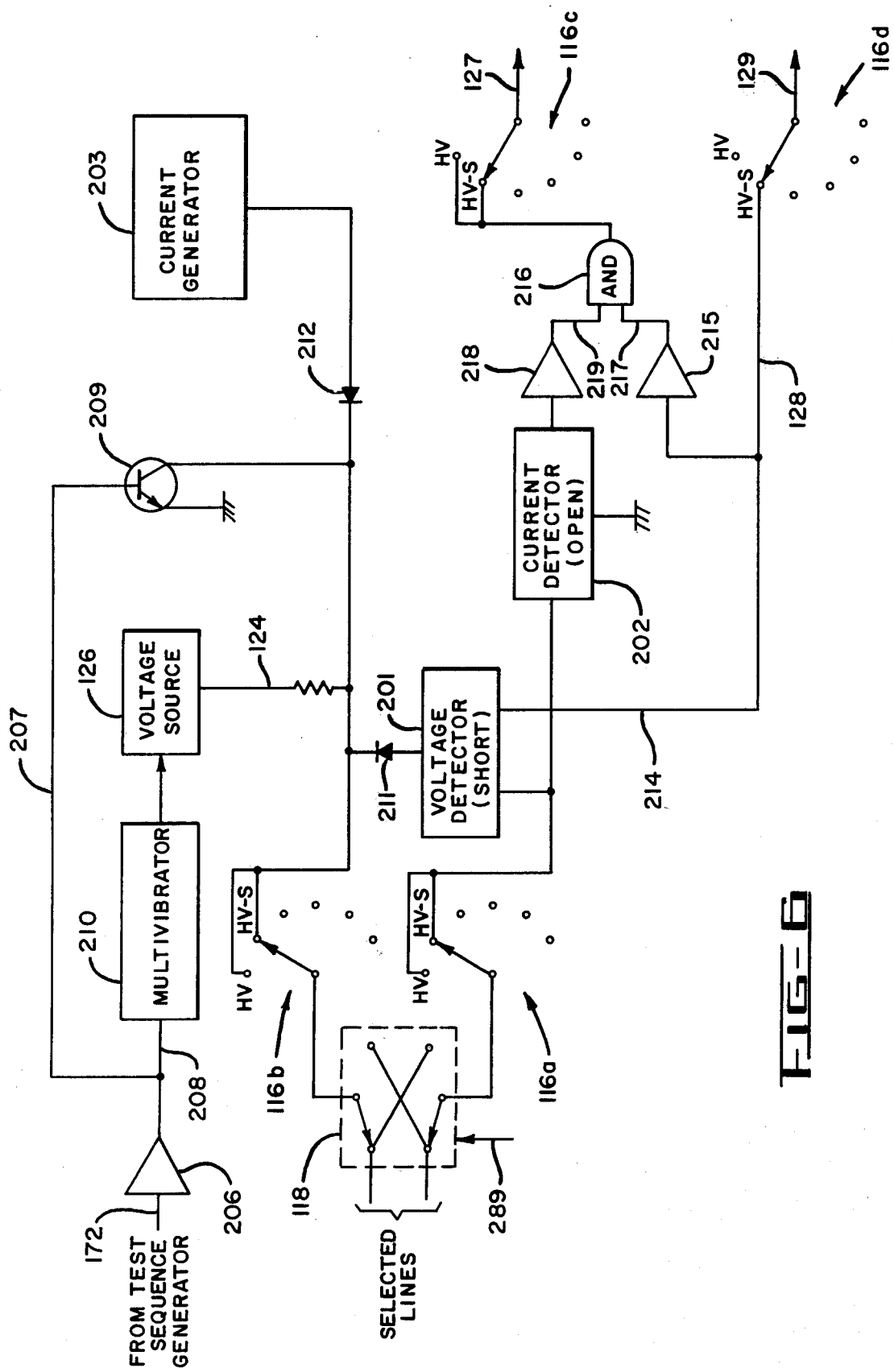
FIG. 6 is a schematic block diagram of the high voltage test circuit.
Figure 10:
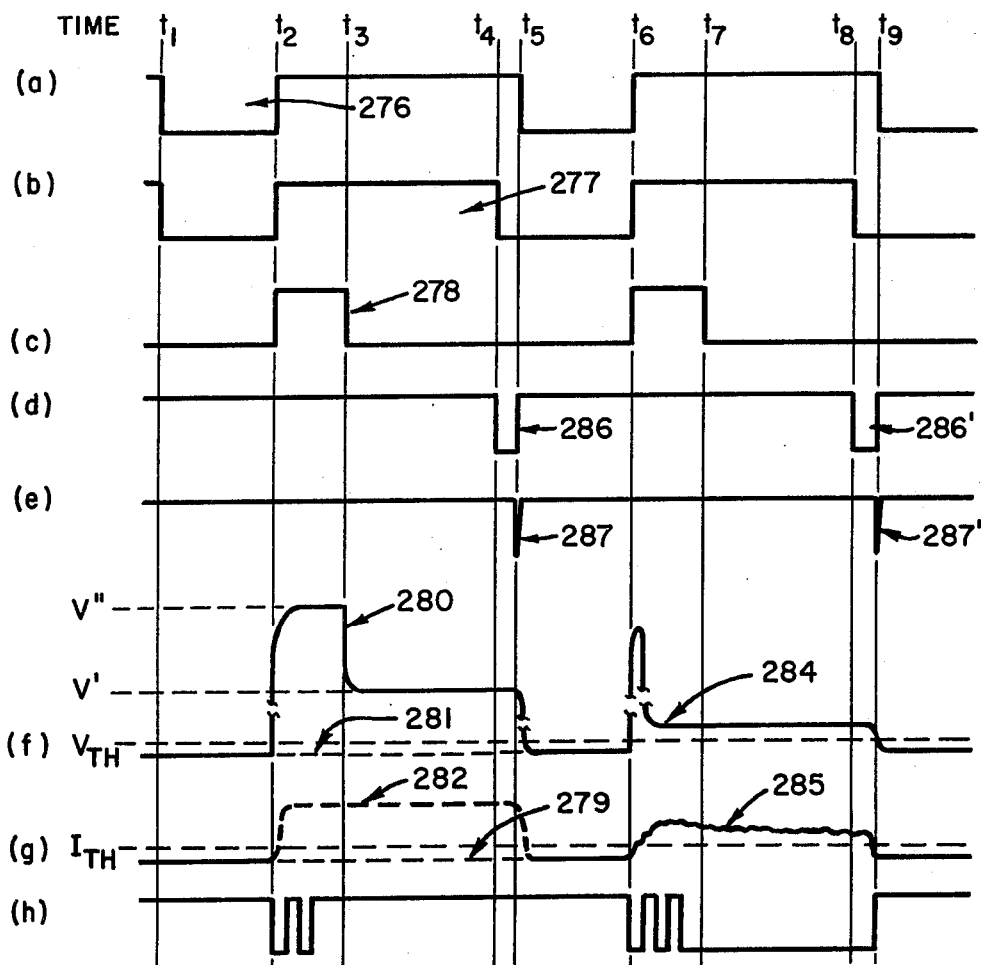
Figure 12:
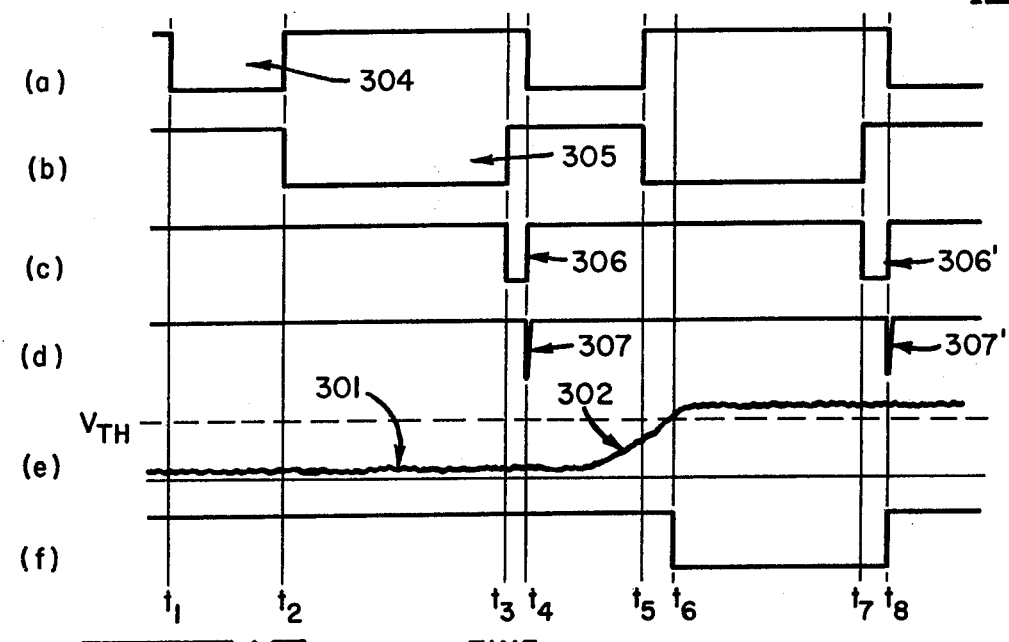

FIGS. 10a–h are waveforms illustrating the operation of the high voltage test circuit of FIG. 6;

FIGS. 11a–f are waveforms illustrating the operation of the ringer search test circuit of FIG. 7;

FIGS. 12a–f are waveforms illustrating the operation of the audio sweep test circuit of FIG. 10;

FIGS. 13a–j are waveforms illustrating the operation of the on-line test circuit of FIG. 10;

TABLE 1 illustrates the operation of a J–K flip-flop of the counter of FIG. 5;

TABLE 2 illustrates the operation of a counter and the associated relay tree;

TABLE 3 illustrates the operation of the counters and associated relay trees for pairing each line of plug A with each line of plug B and for pairing each line of plug A with every other line of plug A;

TABLES 4A and 4B illustrate the operation of the high voltage test circuit of FIG. 6; and TABLE 5 illustrates the operation of the ringer search test circuit of FIG. 7.

DESCRIPTION OF PREFERRED EMBODIMENT
(U)

Figure 1:
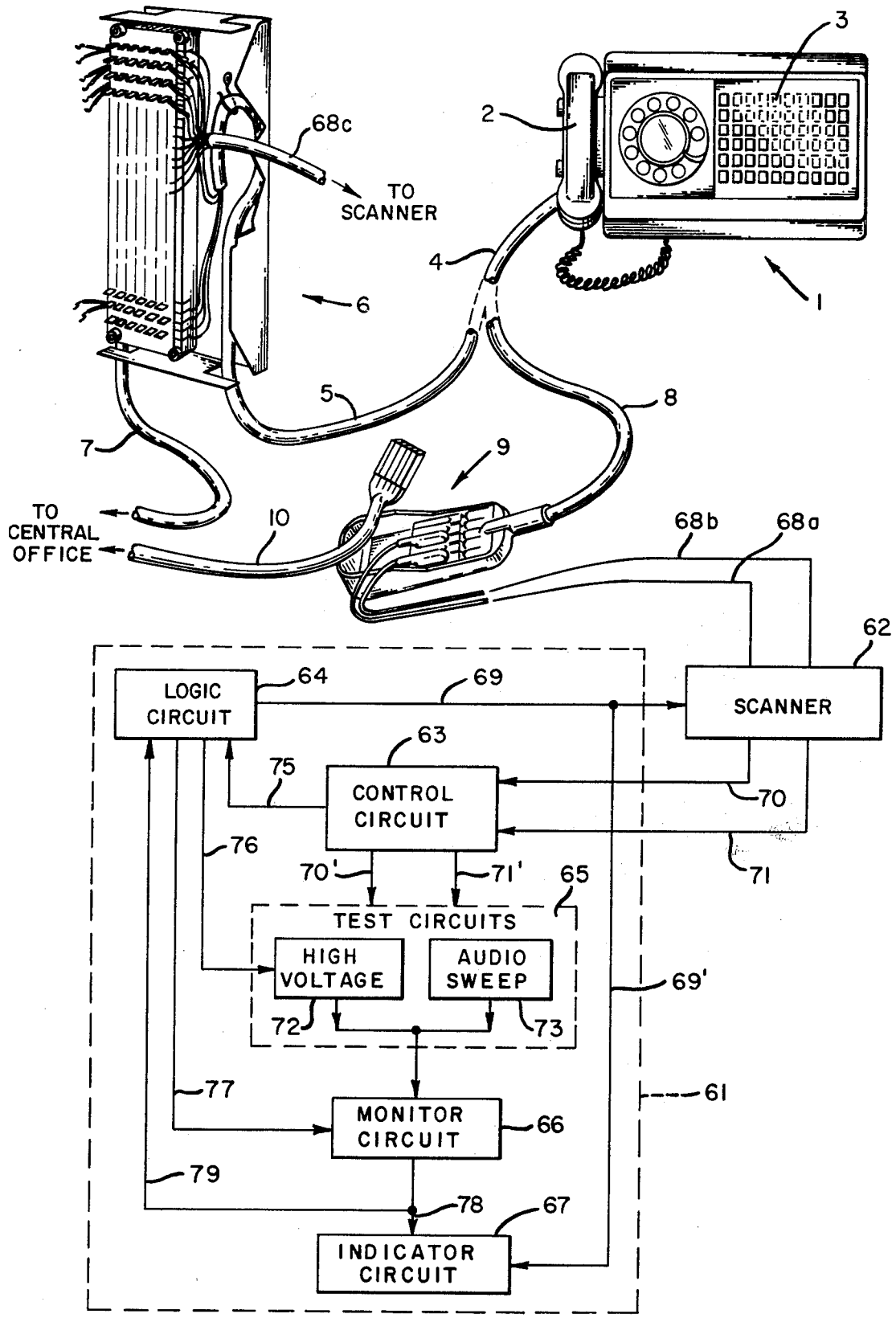
FIG. 1 is a schematic block diagram of a telephone test set embodying this invention and connected to a subscriber key telephone set.

Referring now to FIG. 1, the subscriber key telephone set 1 comprises a handset 2 and a plurality of pushbutton keys 3 for connecting the telephone 1 to a number of different telephone lines. Subscriber set 1 may be connected through mounting cords 4 and 5, connection block 6, and key cable 7 to the central office of the telephone company. Alternatively, the subscriber set may be connected through mounting cords 4 and 8, plug assembly 9, and key cable 10 to the central office.

Figure 2:
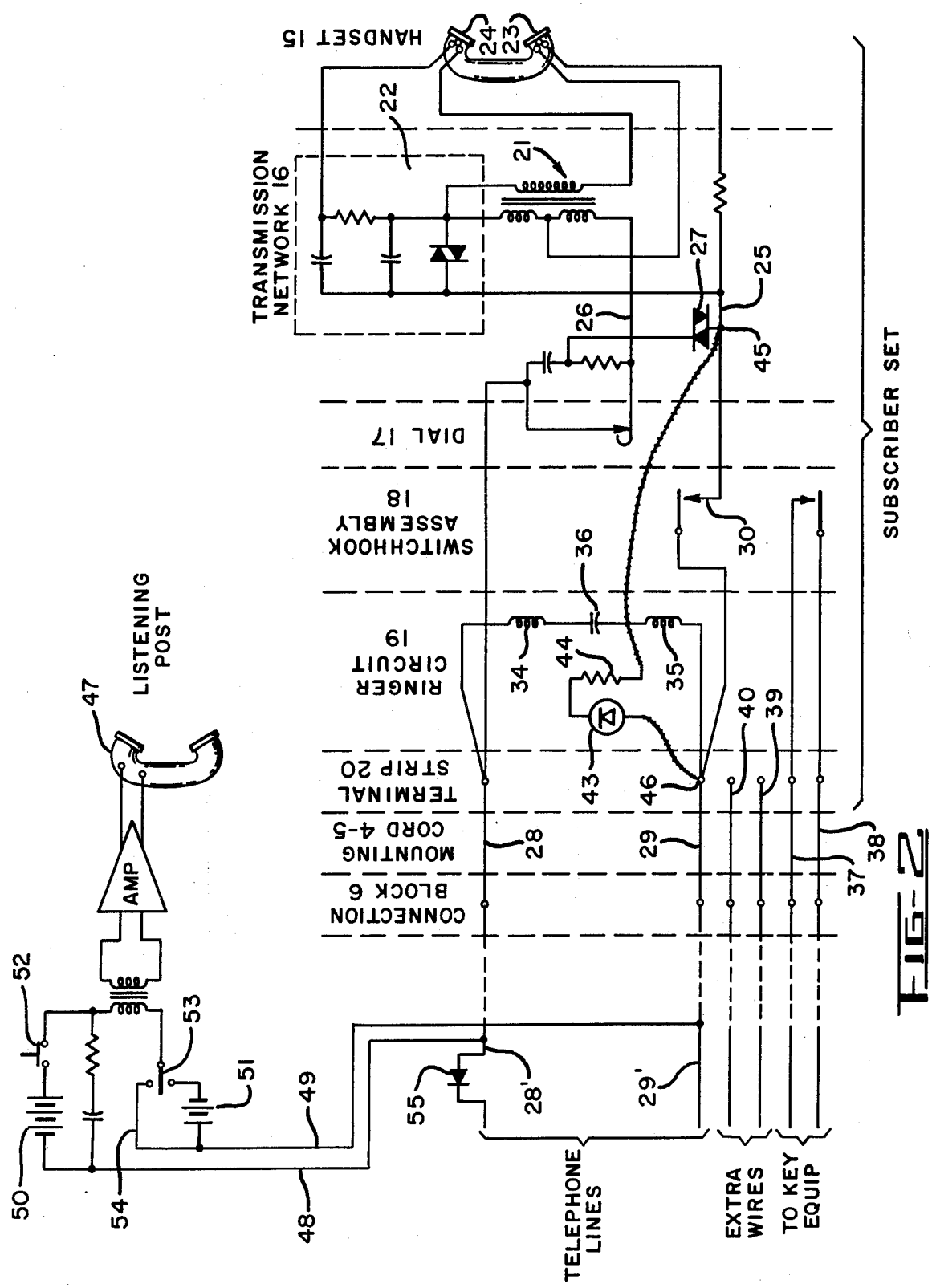
FIG. 2 is a schematic circuit diagram of a subscriber telephone set including circuitry converting the set to be a clandestine audio surveillance device.

As illustrated in FIG. 2, a subscriber set comprises handset 15, transmission network 16, dial 17, switchhook assembly 18, ringer circuit 19, and a terminal strip 20. The subscriber set is, by way of example, connected through mounting cord 4–5 to connection block 6 which is also connected to the central office. Three-winding transformer 21 and sidetone balancing network 22 of the transmission network 16 comprise a hybrid which connects the transmitter 23 in conjugate with the receiver 24 of handset 15. The handset is connected through lines 25 and 26 and dial 17 to the switchhook assembly. Varistor 27 is electrically connected between lines 25 and 26 for reducing the relay chatter coupled to receiver 24 during operation of dial 17. The circuit of FIG. 2 illustrates a subscriber set when the handset is in the cradle such that the switchhook is open and the set is inoperative.

Conductor 26 is directly connected through the switchhook assembly and conductor 28 of the mounting cord to connection block 6. Conductor 25, however, is connected through the switchhook assembly and conductor 29 of the mounting cord to connection block 6 only when the switchhook is activated by closing the contacts of switch 30. For the sake of clarity, only the connection of the subscriber set to the single pair of lines 28 and 29 of the mounting cord is illustrated in FIG. 2.

Ringer circuit 19 comprises ringer inductors 34 and 35 and ringer capacitor 36 which are connected across lines 28 and 29. Current for energizing the ringer inductors and actuating the associated clapper (not shown) is provided by the central office on lines 28 and 29.

Lines 37 and 38 provide a signal to the central office for indicating when the handset is removed from the switchhook and the subscriber set is in use. The mounting cord may also include extra lines such as lines 39 and 40. The mounting cord of a relatively complex subscriber key telephone set may have as many as 250 separate lines which normally terminate in five plugs each connected to 50 different lines.

In operation, when the contacts of switch 30 are connected by removing the handset from the cradle, battery voltage from the central office is applied on lines 28 and 29 to actuate the carbon microphone of transmitter 23. When a speaker talks into the transmitter, sound pressure on a diaphragm causes the contact resistance of the carbon microphone to vary. This resistance variation modulates the battery current flowing through the microphone and translates the acoustic signal to an electrical signal which is transmitted on lines 28 and 29 to the central office. A portion of the transmitted signal is also coupled through transformer 21 as a sidetone to the receiver portion of the handset. Current coupled to receiver 24 passes through the winding of an electromagnet (not shown). A varying current in the winding produces a varying magnetic field which is coupled to the diaphragm of a modulator that produces sound waves corresponding to those delivered to the transmitter by the speaker.

The transmitter and receiver of the handset are normally inoperative when the contacts of switch 30 are open, as illustrated in FIG. 2. It is possible, however, to convert the subscriber set to be a clandestine audio surveillance device even when the handset is in the cradle and the contacts of switch 30 are open. One technique for modifying the subscriber set to operate as a listening device is illustrated in FIG. 2. It consists of bypassing switch 30 of the switchhook assembly with 4-layer diode 43 connected in series with a current limiting resistor 44 between point 45 on line 25 and point 46 on line 29. The subscriber set is connected to a receiver 47 at a remote listening post through lines 48 and 49 which are connected to the telephone lines 28' and 29', respectively. The remote listening post also includes batteries 50 and 51 and switches 52 and 53.

In order to operate the subscriber set as a listening device, receiver 47 is connected through switch 53 and short circuit 54 to line 29'. Battery 50 is momentarily connected across lines 28' and 29', and thus across diode 43, by actuating pushbutton switch 52. The high DC voltage provided by battery 50 causes the 4-layer diode 43 to breakdown and conduct, thus bypass the switchhook assembly. The diode 43 continues to conduct after the high voltage is removed from lines 28' and 29' by current from the central office. The resistance of resistor 44 is chosen so that current passed thereby is low enough that it will not be detected at the central office. A current blocking diode 55 is connected in line 28' to prevent the high voltage provided by battery 50 being detected by the central office.

Another technique for bypassing the switchhook (switch 30) is to connect a wire (not shown) between point 45 and extra wire 40. Line 49 from the listening post is then connected to the extra wire 40, rather than to line 29'. The subscriber set is caused to operate as a listening device by connecting receiver 47 through switch 53 and battery 51 to line 40. The DC voltage provided by battery 51 activates the carbon microphone of transmitter 23 which then transmits conversations adjacent thereto to the remote listening post.

The switchhook may also be bypassed by connecting a resistor (not shown) between points 45 and 46. The subscriber set is then made to operate as a listening device by connecting the receiver 47 through switch 53 and short circuit 54 to line 29'. The current required to activate the carbon microphone of transmitter 23 is supplied by the central office. The resistance of the bypass resistor is chosen so that current passed thereby will not be detected by the central office. The bypass resistor may be shunted by a small capacitor which provides a low impedance bypass for audio frequency signals.

Still another technique for bypassing the switchhook assembly consists of connecting a miniature neon lamp, in series with a current limiting resistor, between points 45 and 46. The subscriber set is caused to operate as a listening device by connecting receiver 47 and the battery 50 across the lines 28' and 29' as stated above for the 4-layer diode.

The aforementioned techniques utilize the transmitter 23 or mouthpiece of the subscriber set for coupling audio signals to the remote listening post. It is also possible to modify the subscriber set such that the receiver 24 or earpiece of the subscriber set operates as a microphone for coupling signals to the remote listening post. This technique comprises removing the short circuit (not shown) from receiver 24 and bypassing the switchhook with a capacitor (not shown) connected between points 45 and 46. Sound waves in the vicinity of the handset cause the diaphragm of receiver 24 to vibrate and to vary the magnetic field of the associated magnet. This magnetic field variation causes current to flow through the windings of the electromagnet to the listening post.

A different technique for modifying the subscriber set to operate as a listening device consists of concealing a miniature microphone (not shown) in the subscriber set. The microphone may be connected to an extra pair of lines 39 and 40 in the mounting cord. When this technique is employed, the conductors 48 and 49 from the remote listening post are connected to the extra wires 39 and 40.

Again referring to FIG. 1, the test set for determining whether the subscriber key telephone set 1 has been modified to operate as a clandestine listening device comprises an analyzer 71 and a scanner 62. Analyzer 61 comprises control circuit 63, logic circuitry 64, test circuits 65, monitor circuit 66, and indicator circuit 67.

Scanner 62 is connected through cables 68a and b, plug assembly 9, by way of example, and mounting cords 8 and 4 to the subscriber set. Since it is possible for a modification of the subscriber set to be made between any pair of conductors in the mounting cord, it is necessary to test each pair of lines in the mounting cord. The particular lines under test are referred to hereinafter as the selected lines. Scanner 62 is responsive to the output of logic circuit 64 on line 69 for sequentially connecting every possible pair of lines in the mounting cord through lines 70 and 71, control circuit 63 and lines 70' and 71' to test circuits 65.

There are two basic tests for determining whether a subscriber set is modified to operate as a clandestine listening device. These tests are the high voltage test performed by circuit 72 and audio sweep test performed by circuit 73.

In the high voltage test, a large DC voltage is applied to the selected lines to activate any breakdown devices connected across these lines. The selected lines are then analyzed to determine whether there is (1) an open circuit, (2) an unauthorized short circuit, or (3) an intermediate impedance across the lines, the latter two conditions indicating that the subscriber set is modified to operate as a clandestine listening device. In the audio sweep test, the handset is illuminated with an audio signal and the selected lines are analyzed to determine whether an audio signal is present on these lines.

In operation, control circuit 63 determines which test circuit is connected through lines 70 and 71 to the scanner. By way of example, consider that the high voltage test circuit 72 is connected to the scanner. The output of the control circuit on line 75 causes the logic circuit to generate signals for controlling (1) selection of pairs of lines connected to the scanner, and (2) testing of selected lines. The output of the logic circuit on line 69 causes the scanner to connect a pair of lines to the test circuit. The control signal on line 69 is also applied on line 69' to circuit 67 for indicating which pair of lines is presently under test. A predetermined time $T_1$ after selection of each pair of lines, test circuit 72 is responsive to the control signal on line 76 for applying a high voltage signal to the selected lines. A predetermined time $T_2$ after application of the high voltage to the selected lines, circuit 66 is responsive to the control signal on line 77 for monitoring the output of the test circuit for determining whether a fault exists on the selected lines.

A fault is defined as an abnormal condition existing on the selected lines, indicating that an unauthorized connection is across the lines and that the subscriber set is a clandestine listening device. The output of the monitor circuit is applied to circuit 67 for indicating the status of the lines under test and is applied on line 79 to the logic circuit. If the output of the monitor circuit indicates that a fault exists on the selected lines, the signal on line 79 causes the logic circuit to interrupt automatic selection and test of the lines. If the output of the monitor circuit on line 79 indicates that the status of the selected lines is normal, the output of the logic circuit on line 69 causes the scanner to automatically connect a new pair of selected lines to the test circuits for test. This operation continues until each pair of lines in the mounting cable is selected by the scanner and tested by the analyzer.

Figure 3:
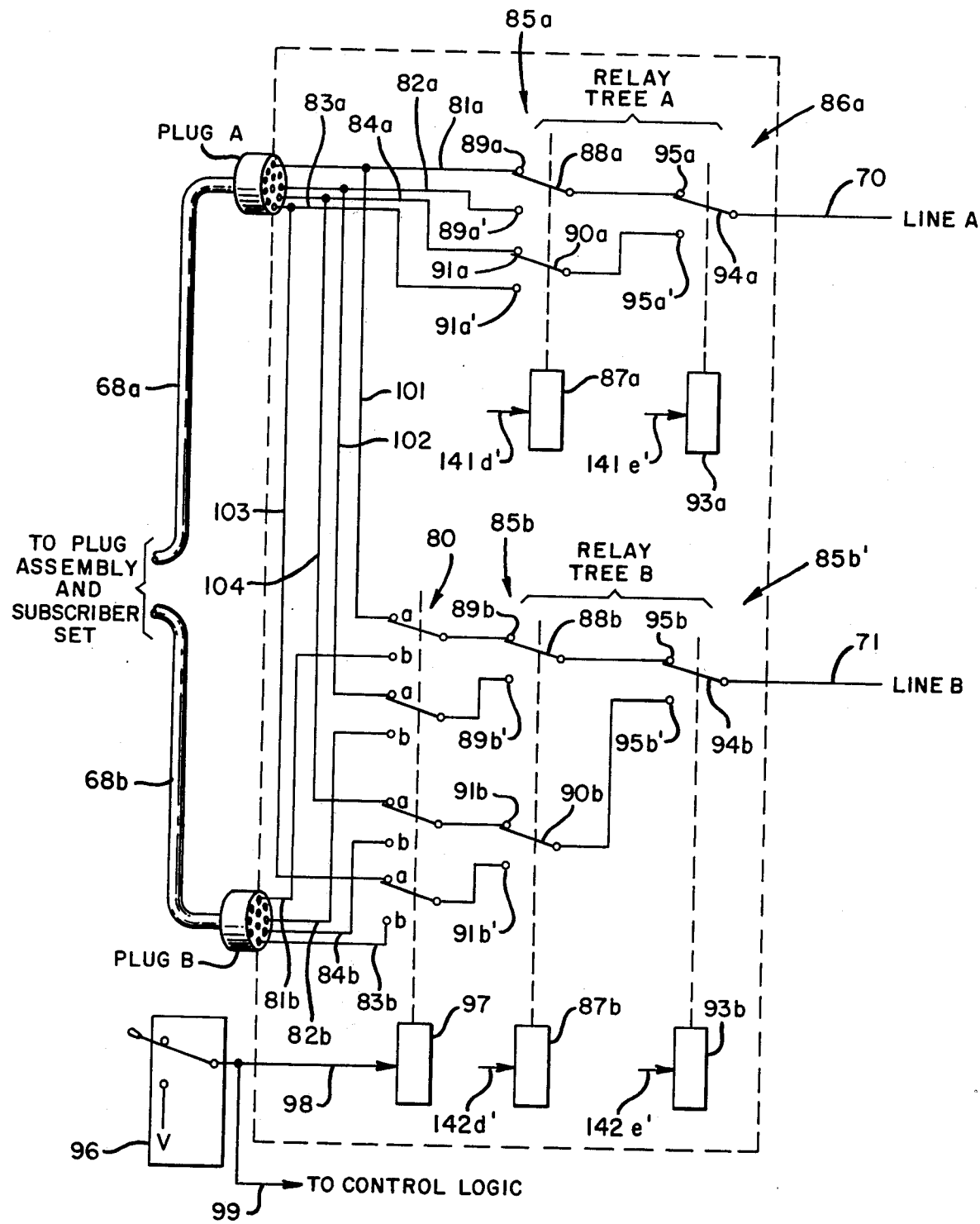
FIG. 3 is a detailed schematic block diagram of the scanner of the telephone test set of FIG. 1.

Referring now to FIG. 3, scanner 62 comprises a pair of relay trees A and B, a pair of plugs A and B, and a plug select relay 80. Each of the relays is deenergized as illustrated in FIG. 3. The scanner is connected through cables 68a and 68b to the plug assembly and the subscriber set. The scanner may also be connected to the subscriber set through a single cable. In practice, connecting cables 68 and plugs A and B each contain 50 lines. For the sake of clarity, however, only four lines 81a–84a and 81b–84b are connected to plugs A and B, respectively. Relay trees A and B are connected to the associated plugs A and B in a similar manner. Only the connection of relay tree A to plug A will therefore be described in detail. Similar components of relay trees A and B are referred to by the same reference character followed by the letters "a" and "b," respectively.

Relay tree A comprises a pair of relays 85a and 86a. Relay 85a is a two-pole relay comprising relay coil 87a and a pair of form C contacts. The first form C contact comprises movable arm 88a and a pair of stationary contacts 89a and 89a'. The lines 81a and 82a are connected to the relay contacts 89a and 89a', respectively. Similarly, the second form C contact comprises a movable arm 90a and a pair of stationary contacts 91a and 91a'. The lines 83a and 84a, however, are connected to the contacts 91a' and 91a, respectively.

Relay 86a is a single-pole relay comprising a relay coil 93a and a single form C contact including movable arm 94a and a pair of stationary contact 95a and 95a' connected to the movable arms 88a and 90a, respectively. Movable arm 94a is connected to one output of the scanner on line 70. In a similar manner, the movable arm 95b is connected to the other output of the scanner on line 71.

The two types of scan provided by the scanner are the A—A scan (plug A against plug A) and the A-B scan (plug A against plug B). In the A—A scan, every line of plug A is sequentially paired with every other line of plug A. In the A-B scan, every line of Plug A is paired with everyline of plug B. Plug select switch 96 controls the operation of relay 80 and thus the type of scan provided by the scanner.

Relay 80 is a four-pole relay comprising relay coil 97 and four form C contacts. The movable arms of the form C contacts of relay 80 are each associated with a pair of stationary contacts "a" and "b." When the movable arm of the two-pole scan select switch 96 is in the position shown in FIG. 3, relay coil 97 is deenergized and the movable arms of relay 80 connect relay tree B through contacts "a" and lines 101-104 to the lines 81a-84a, respectively, of plug A. Thus, the scanner operates in the A—A scan. Conversely, when the movable arm of the two-pole scan select switch 96 is connected to the switch voltage V, coil 97 is energized and the movable arms of relay 80 connect relay tree B through contacts "b" to lines 81b-84b of plug B. Thus, the scanner operates in the A-B scan.

Figure 4:
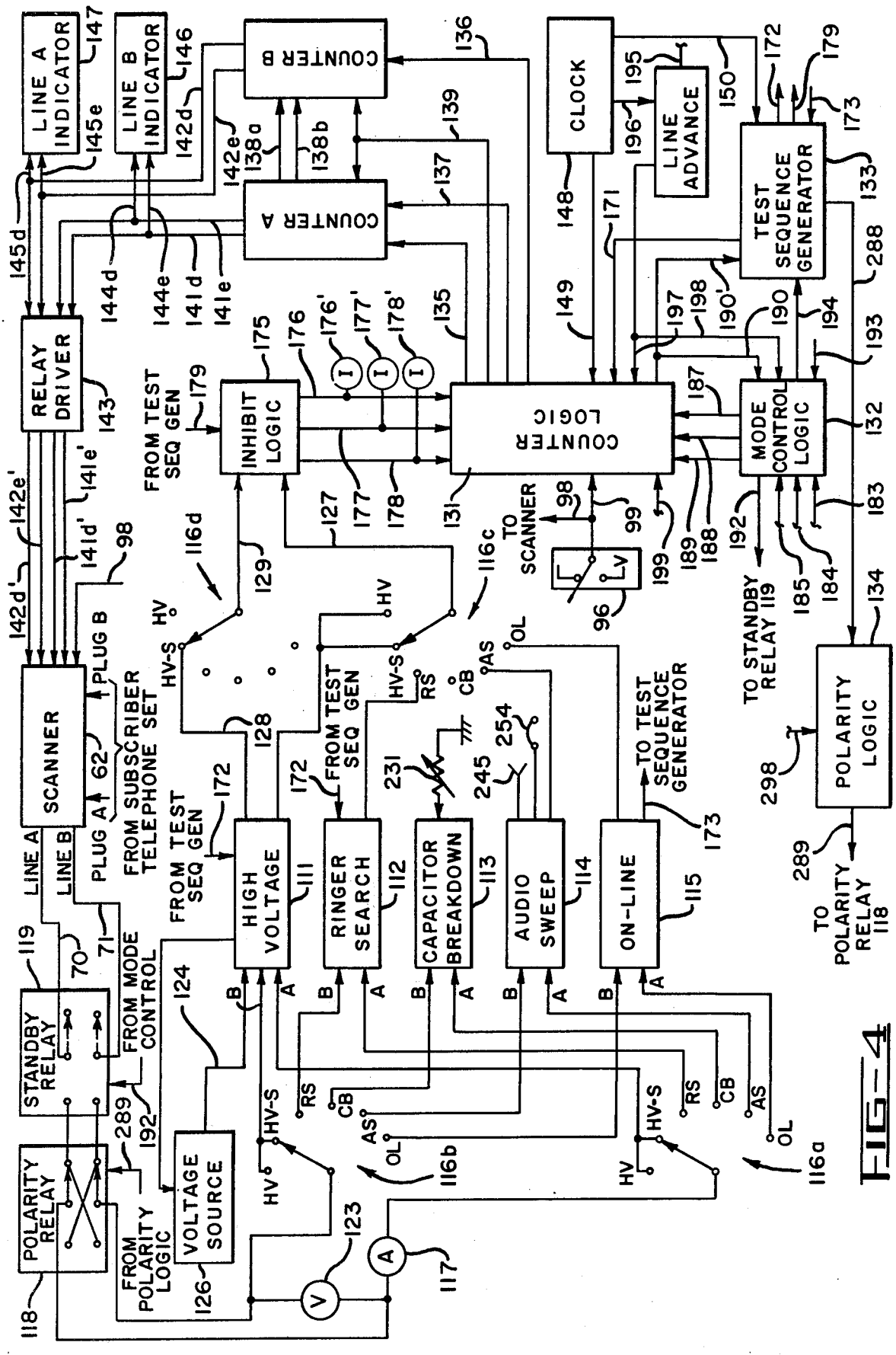
FIG. 4 is a detailed schematic block diagram of the analyzer of the telephone test set of FIG. 1.

Referring now to the detailed schematic block diagram of analyzer 61 in FIG. 4, the test circuits 65 comprise high voltage test circuit 111, ringer search test circuit 112, capacitor breakdown test circuit 113, audio sweep test circuit 114, and on-line test circuit 115. Control circuit 63 comprises test selector switches 116 that determine which test circuit is connected to the selected lines. The test selector switches are actually ganged together such that they change to a new position simultaneously. These connections are not shown in the FIGURES, however, for the sake of clarity. Switches 116 are break-before-make switches which cause the test set to operate in a standby mode, as described more fully hereinafter, when the switches are changed to a new position.

The A input terminal of each test circuit is connected through test selector switch 116a, ammeter 117, polarity relay 118, and standby relay 119 to line A (line 70) from the scanner, and thus to one of the selected lines. The B input terminal of each test circuit is connected through switch 116b and relays 118 and 119 to line B (line 71) from the scanner, and thus to the other of the selected lines. A voltmeter 123 is connected across the selected lines. A third input to the high voltage test circuit on line 124 is connected to voltage source 126. An output of test circuits 111, 112, 114 and 115, indicating the status of the selected lines, is coupled through test selector switch 116c to line 127. A second output of the high voltage test circuit on line 128, indicating whether a short circuit exists on the selected lines, is coupled through test selector switch 116d to line 129. The outputs of the test circuits on lines 127 and 129 indicate the status of the selected lines.

Logic circuit 64 comprises counter control logic circuit 131, counters A and B, mode control logic circuit 132, test sequence generator 133, and polarity logic circuit 134. The outputs of the counter logic on lines 135 and 136 control the operation of and thus the count stored by the counters A and B, respectively. The output of the counter logic on line 137 causes the count stored by counter A to be transferred on lines 138a and 138b to counter B as is explained more fully hereinafter. The output of the counter logic on line 139 causes counter A and B to reset.

The outputs of counters A and B on lines 141d and 141e and on lines 142d and 142e, respectively, control the operation of relay driver 143. The outputs of the relay driver are applied on lines 141d',141e' and 142d', 142e' to the scanner for controlling which pair of selected lines is connected on lines 70 and 71 to the test circuits. The outputs of counters A and B are also applied on lines 144d and 144e and on lines 145d and 145e to line A and line B indicators 146 and 147, respectively, for indicating which pair of selected lines is connected to the test circuits.

A clock signal from clock 148 is applied on line 149 to the counter control logic and on line 150 to the test sequence generator for synchronizing the operation of these circuits and counters A and B.

Since the circuitry comprising counters A and B are similar, only counter A will be described in detail. Referring now to FIG. 5, counter A comprises a pair of bistable multivibrators or J-K flip-flops 161 and 162. A detailed description of the J-K flip-flop is found in Logical Design Of Digital Computers by M. Phister, Jr., John Wiley and Sons, Inc., 1961. The flip flops each have a pair of inputs referred to as the J and K inputs and a pair of outputs referred to as the Q and $\overline{Q}$ outputs. The $\overline{Q}$ output is the conjugate of the Q output. For example, if the Q output is "1", the $\overline{Q}$ output is "0". The Q and $\overline{Q}$ outputs of flip-flop 161 are connected on lines 163 and 164 to the J and K inputs, respectively, of flip-flop 162. Conversely, however, the Q and $\overline{Q}$ outputs of flip-flop 162 are connected on lines 165 and 166 to the K and J inputs, respectively, of flip-flop 161. The outputs of the counter logic on lines 135 and 137 are applied to each flip-flop for controlling the operation thereof.

The operation of a J-K flip-flop, e.g., flip-flop 162, will be described in relation to TABLE 1. The digital representation in the J and K columns indicates the state of the associated input signals to flip-flop 162 when the count pulse from the counter logic is applied thereto on line 135b. The representation in the $Q_{n+1}$ column indicates the state of the Q output of the flip-flop 162 after the count pulse is applied thereto. As indicated in row 1, when the J and K inputs are both "0", the Q output will remain the same as it was before receipt of the clock pulse. If only the J input is a "1", however, the Q output of the flip-flop is a "1" (row 2). If both the J and K inputs are "1", the Q output of the flip-flop is the conjugate of what it was prior to receipt of the count pulse (row 3). If only the K input is "1", however, the Q output of the flip-flop is "0" (row 4).

The Q outputs of flip-flops 161 and 162 are the outputs of counter A on lines 141d and 141e, respectively. These Q outputs are also the outputs of counter A on lines 138a and 138b. The operation of flip-flops 161 and 162, and thus the operation of counter A, in sequentially connecting each line of plug A through relay tree A to the output of the scanner on line A (line 70), will be described in detail in relation to TABLE 2.

As stated previously, the relay coils in FIG. 3 are deenergized. When the test set is initially turned on, the flip-flops are reset by the output of the counter logic on line 139 such that the Q outputs of the flip-flops, and thus the outputs of the counter on lines 141d and 141e, are both "0" (row 1, columns 1 & 2, TABLE 2). These outputs of counter A deenergize relays 87a and 93a (row 1, columns 3 & 4). Thus, line 81a of plug A is connected through contact 89a, arm 88a, contact 95a and arm 94a to the scanner output on line A (row 1, column 5). The first count pulse from the counter logic on line 135 causes flip-flop 161 to advance the Q output on line 141d to a "1" while the Q output on line 141e remains a "0" (row 2, columns 1 & 2). This operaton is in accord with the operation of the J-K flip-flop (row 1, TABLE 1). The output on line 141d' energizes relay 87a (row 2, column 2, TABLE 2), connecting movable arm 88a to contact 89a'. Thus, the second line 82a of plug A is connected through contact 89a', arm 88a, contact 95a and arm 94a to the scanner output on line A.

The second count pulse on line 135 causes the Q output on line 141d to remain a "1" and biases flip-flop 162 to advance the Q output on line 141e to a "1" (row 3, columns 1 & 2, TABLE 2). The output on line 141e' energizes relay 93a (row 3, column 3) to connect movable arm 94a to contact 95a'. Thus, the third line 83a of plug A is connected through the A relay tree, (through contact 91a', arm 90a, contact 95a' and arm 94a) to the scanner output on line A. The third count A pulse on line 135 causes flip-flop 161 to advance the Q output on line 141d to "0" (row 4, column 1). The associated signal on line 141d' deenergizes relay 87a (row 4, column 3) to connect movable arm 90a to the contact 91a. Thus, the fourth line 84a of plug A is connected through contact 91a, arm 90a, contact 95a' and arm 94a to the scanner output on line A. The operation of the counter B is similar to the above except that during the A—A scan, when every line of plug A is paired with every other line of plug A, the Q outputs of flip-flops 161 and 162 of counter A are transferred on lines 138a and 138b, respectively, to the associated flip-flops of counter B.

Test sequence generator 133 controls the time sequence of operations performed during test of selected lines. A control signal from generator 133 is applied on line 171 to the counter logic. A control signal from generator 133 is also applied on line 172 through high voltage test circuit 111 to voltage source 126 and to ringer search test circuit 112. A control signal from the on-line test circuit 115 is applied on line 173 to the test sequence generator.

The monitor circuit 67 of FIG. 1 comprises the inhibit logic circuit 175 of FIG. 4. The outputs of the test circuits on lines 127 and 129 are applied to the inhibit circuit. Outputs of the inhibit circuit on lines 176, 177 and 178 control the operation of the associated indicator lamps 176', 177' and 178' and the counter control logic 131. The inhibit circuit is responsive to an output of the test sequence generator on line 179 for reading the outputs of the test circuits and thus the status of the selected lines. Lamp 176' indicates whether a fault exists in the selected lines. Lamps 177' and 178' indicate whether a short circuit or the ringer circuit, respectively, is connected across the selected lines.

There are three basic modes of operation of the test set: the standby mode, the manual mode, and the automatic mode. The test set is caused to operate in the standby, manual, or automatic mode by actuating the associated push button mode select switch 183, 184 or 185 of mode control logic 132. Outputs of the mode control logic on lines 187, 188 and 189 bias the counter control logic to operate the scanner in the standby, manual, or automatic mode, respectively. The output of the counter logic on lines 190 and 190' bias the mode control logic to operate the test set in the manual mode and the test sequence generator to stop the test, respectively, whenever the outputs of inhibit circuit 175 indicate that the ringer circuit, a short circuit or a fault is on the selected lines.

In the standby mode, the test circuits are disconnected from the selected lines and the scanner outputs on lines 70 and 71. This is accomplished by the output of mode control logic 132 on line 192 which deenergizes standby relay 119 (as illustrated in FIG. 4) for providing an open circuit between the test circuits and the scanner. The output of mode control logic 132 on line 187 biases the counter logic to refrain from advancing counters A and B. An input to the mode control logic on line 193 from the test selector switch causes the test set to operate in the standby mode whenever the position of the test selector switch is changed.

When the test selector switch is positioned for connection to the appropriate test circuit and mode control switch 184 is actuated to operate the test set in the manual mode, the output of the mode control logic on line 192 energizes standby relay 119 to connect the scanner outputs on lines 70 and 71 to the test circuit. The output of the mode control logic on lines 188 and 194 bias the counter logic and the test sequence generator, respectively, for testing the selected lines. The inhibit circuit is responsive to the control signal on line 179 for reading the status of the selected lines. If the selected lines contain the ringer circuit, a short circuit or a fault, an associated output of the inhibit circuit causes a lamp to light to indicate the status of the selected lines. The counter logic does not automatically advance the counters to connect a new pair of selected lines to the test circuit. The test set remains in the manual mode, indicating the status of the selected lines. In order to connect a different pair of selected lines to the test circuit, line advance switch 195 is actuated to connect the output of the clock on line 196 to the control logic. The clock signal on line 197 biases the control logic to advance the counters, and thus the selected lines, until the line advance switch is deactivated. The output of switch 195 on line 198 causes the system to operate in the standby mode during advancing of the selected lines. Mode select button 184 must again be actuated to initiate test of the new pair of selected lines.

When the test select switch is positioned for connection to the appropriate test circuit, selector switch 96 is positioned for the desired type scan and the counters are reset by actuating pushbutton reset switch 199 on the counter logic. The test set is caused to operate in the automatic mode by actuating mode select switch 185. The output of the mode control logic on line 192 energizes the standby relay to connect the scanner outputs to the test circuit. The output of circuit 132 on line 189 biases the counter logic to operate in the automatic mode and advance counter B to connect a pair of selected lines to the test circuit. The output of circuit 132 on line 194 biases the test sequence generator to start test of the selected lines. After a predetermined time, the inhibit circuit is responsive to the output of generator 133 on line 179 for reading the status of the selected lines. If the output of the test circuit on line 127 indicates that the ringer circuit, a short circuit or a fault is on the selected lines, an output of the inhibit circuit biases the counter logic to prevent advance of the counters and causes an appropriate lamp 176' to 178' to light and indicate the condition on the selected lines. The output of the control logic on lines 190 and 190' bias the mode control logic and test sequence generator to operate in the standby mode.

If the output of the test circuit on line 127 does not indicate an abnormal condition on the selected lines when the inhibit circuit reads the status of the selected lines, the counter logic is responsive to the end of test pulse from the test sequence generator on line 171 for advancing the counters to connect a new pair of selected lines to the analyzer. Each pair of selected lines is automatically tested until an abnormal condition is detected on a pair of lines or until every pair of lines in the mounting cable 68 is tested by the analyzer. (This operation is more clearly illustrated by reference to TABLE 3.)

In an actual system, plugs A and B each contain 50 separate lines. For the sake of clarity, however, only the four lines 81–84 are connected to plugs A and B in FIG.

3. Since an unauthorized modification of the subscriber set may be connected across any of the conductors of the mounting cord, it is necessary to sequentially connect every possible pair of conductors in the mounting cord to the analyzer.

If only one connecting cable 68a is required to connect all of the lines of the mounting cord to the scanner, scan select switch 96 is switched to the position shown in FIG. 3 in order to pair the lines of plug A with every other line of plug A. If two connecting cables 68a and 68b are required to connect the lines of the mounting cord to the scanner, it is necessary to pair every line of plug A with every other line of plug A, and to pair every line of plug A with every line of plug B. The lines of the cable 68b are paired with every other line of cable 68b by connecting that cable to plug A and repeating the test with th scan select switch in the position shown in FIG. 3. The operation of the counters and relays in the automatic mode for performing these operations will be described in relation to TABLE 3.

When it is desirable to pair the lines of plug A with the lines of plug B, i.e., to operate in the A-B scan mode, the movable arm of the selector switch 96 is connected to the voltage V to energize relay coil 97 (rows 1-16, column 3, TABLE 3). This connects the lines 81b-84b of plug B through the "b" contacts and movable arms of relay 80 to the contacts 89b, 89b', 91b' and 91b, respectively, or relay tree B. The output of switch 96 on line 99 biases the counter logic to operate the counters in the A-B scan.

The following operation assumes that an abnormal condition is not associated with the selected lines. When the test set is turned on and when the reset button 199 is actuated, the flip-flops of counters A and B are each reset to 0 (row 1, columns 4-6). This causes relays 87 and 93 to be deenergized, (row 1, columns 8-11), as shown in FIG. 3, and lines 81a and 81b to be connected to the scanner outputs on lines A and B, respectively (row 1, columns 12 and 16). After the selected lines 81a and 81b are tested, the count B pulse on line 136 advances counter B to produce an output line 142d (row 2, column 6) which energizes relay 87b (row 2, column 10) to pair lines 81a and 82b (row 2, columns 12 and 17) at the scanner outputs on lines A and B, respectively. Line 82b is connected through a contact "b", contact 89b', arm 88b, contact 95b and arm 94b to line B. After the selected lines 81a and 82b are tested, the count B pulse again advances counter B to produce an output on line 142e (row 3, column 7) which also energizes relay 93b (row 3, column 11) to pair lines 81a and 83b (row 3, columns 12 and 18) at the scanner outputs on lines A and B, respectively. Line 83b is connected through a contact "b", contact 91b', arm 90b, contact 95b' and arm 94b to line B.

After the selected lines 81a and 83b are tested, the next count B pulse advances counter B to produce an output on line 142d (row 4, column 6, TABLE 3) that now deenergizes relay 87b (row 4, column 10) to pair lins 81a and 84b (row 4, columns 12 and 19) at the scanner outputs on lines A and B. Line 84b is connected through a contact "b", contact 91b, arm 90b, contact 95b' and arm 94b to line B. After selected lines 81a and 84b are tested, the count B pulse on line 136 advances counter B to reset the counter (row 5, columns 6 and 7) and again connect the line 81b (row 5, column 16) to the scanner output on line B. Simultaneously, a count A pulse on line 135 advances a counter A to produce an output on line 141d (row 5, column 4) which energizes relay 87a (row 5, column 8) to connect line 82a (row 5, column 13) to the scanner output on line A. Line 82a is connected through contact 89a', arm 88a, contact 95a, and arm 94a to line A. These operations are repeated (rows 6-16) until each line of plug A is paired with each line of plug B at the scanner outputs on lines A and B and tested by the analyzer.

When it is desirable to pair each line of plug A with every other line of plug A, i.e., to operate in the A—A scan mode, scan selector switch 96 is positioned as shown in FIG. 3 to deenergize relay coil 97 (rows 17-22, column 3, TABLE 3). This connects the lines 81a-84a of plug A through lines 101-104 and the contacts "a" and movable arms of relay 80 to relay tree B. The output of switch 96 on line 99 biases the counter logic to operate the counters in the A—A scan.

The following operation also assumes that an abnormal condition is not associated with the selected lines. When the test set is turned on and reset button 199 is actuated, the flip-flops of counters A and B are each reset to "0." This connects line 81a of plug A to both scanner outputs on lines A and B. When the automatic mode select switch 185 is actuated, a count B pulse on line 136 advances counter B to produce an output on line 142d (row 17, column 6, TABLE 3) which energizes relay 87b (row 17, column 10) to pair lines 81a and 82a (row 17, columns 12 and 17) at the scanner outputs on lines A and B, respectively. Line 82a is connected through line 102, a contact "a" and an arm of relay 80, contact 89b', arm 88b, contact 95b, and arm 94b to the scanner output on line B. After the selected lines 81a and 82a are tested, subsequent count B pulses advance counter B to pair line 81a with lines 83a and 84a (rows 18 and 19) at the scanner outputs. After these pairs of selected lines are tested, the count B pulse advances counter B to reset the counter. Simultaneously, a count A pulse advances counter A to produce an output on line 141d (row 20, column 4) which energizes relay 87a (row 20, column 8) to connect line 82a (row 20, column 13) to the scanner output on line A. The output of the counter logic on line 137 then causes the contents of counter A to be transferred on lines 138a and 138b to counter B to produce an output on line 142d which energizes relay 87b to also connect line 82a to the scanner output on line B. The count B pulse then advances counter B such that relays 87b and 93b are both energized (row 20, columns 10 and 11) to connect line 83a (row 20, column 18) to the scanner output on line B. These operations are repeated (rows 21-22) until each line of plug A is paired with every other line of plug A at the scanner outputs and is tested by the analyzer.

Referring now to FIG. 6, the high voltage test circuit 111 comprises a voltage detector 201, a current detector 202, and a current generator 203. The high voltage test circuit is connected to the selected lines through test selector switches 116a and 116b.

The output voltage source 126 on line 124 is connected through switch 116b and polarity relay 118 to one of the selected lines. Current generator 203 is also connected through switch 116b to the one selected line. The current generator provides a DC open circuit voltage of up to 600 volts on the one selected line and a current output if there is a path of current flow across the selected lines.

The control pulse from the test sequence generator on line 172 is inverted by inverter 206 and is applied on lines 207 and 208 to control the operation of grounded emitter amplifier 209 and multivibrator 210. Conduction of multivibrator 210 determines the length of time a high voltage pulse from source 126 is applied to the selected lines. Conduction of transistor 209 connects the one selected line and the output of current generator 203 to ground during switching of the relays of scanner 62. Diodes 211 and 212 block the output of source 126 from detector 201 and generator 203 during high voltage pulsing.

Voltage detector 201 is a threshold detector that is connected across the selected lines (through switches 116a and 116b). The output of voltage detector on line 214 indicates whether the voltage on the selected lines exceeds a prescribed threshold. This output of detector 201 is the output of test circuit 111 on line 128 that is connected only through the HV-S (high voltage with short circuit indication) terminal of switch 116d and is applied on line 129 to the inhibit circuit. The output of the voltage detector is also connected through inverter 215 to the input of AND gate 216 on line 217. Current detector 202 is also a threshold device that is connected in series with the other selected line through switch 116a. The output of the current detector indicates whether current flow on the selected lines exceeds a prescribed value. This output of detector 202 is coupled through inverter 218 to the second input of AND gate 216 on line 219. The output of the AND gate is the output of test circuit 111 that is coupled through both of the high voltage terminals (HV and HV-S) of test selector switch 116c to the inhibit circuit.

Ringer search test circuit 112 (see FIG. 7) comprises oscillator 221, upper threshold circuit 222, lower threshold circuit 223, a pair of multivibrators 224 and 225 and an OR gate 226. One terminal 227 of the oscillator is connected through test selector switch 116a to one of the selected lines. The other terminal 228 of the oscillator is connected to a ground. The other selected line is also connected through test selector switch 116b to the ground reference potential. The one terminal 227 of the oscillator and the one selected line are also connected to the inputs of the upper and lower threshold circuits. The multivibrators 224 and 225 are flip-flops which control the operation of OR gate 226. The output of the upper threshold circuit 222 is coupled directly to an input of multivibrator 224. The output of lower threshold circuit 223, however, is coupled through inverter 229 to an input of multivibrator 225. The outputs of the multivibrators control the operation of OR gate 226. The output of the OR gate is the output of test circuit 112 that is coupled through switch 116c and applied on line 127 to the inhibit circuit. The output of the test sequence generator on line 172 is coupled through inverter 230 to inputs of the multivibrators 224 and 225 for resetting the flip-flops.

Capacitor breakdown circuit 113 (see FIG. 8) comprises a potentiometer 234 connected across the terminals of voltage source 235. The tap 236 of the potentiometer is connected through test selector switch 116b and polarity relay 118 to one of the selected lines. The other selected line is connected through the polarity relay, ammeter 117, and test selector switch 116a to the negative terminal of source 235. The voltmeter 123 is connected across the selected lines.

Figure 9:
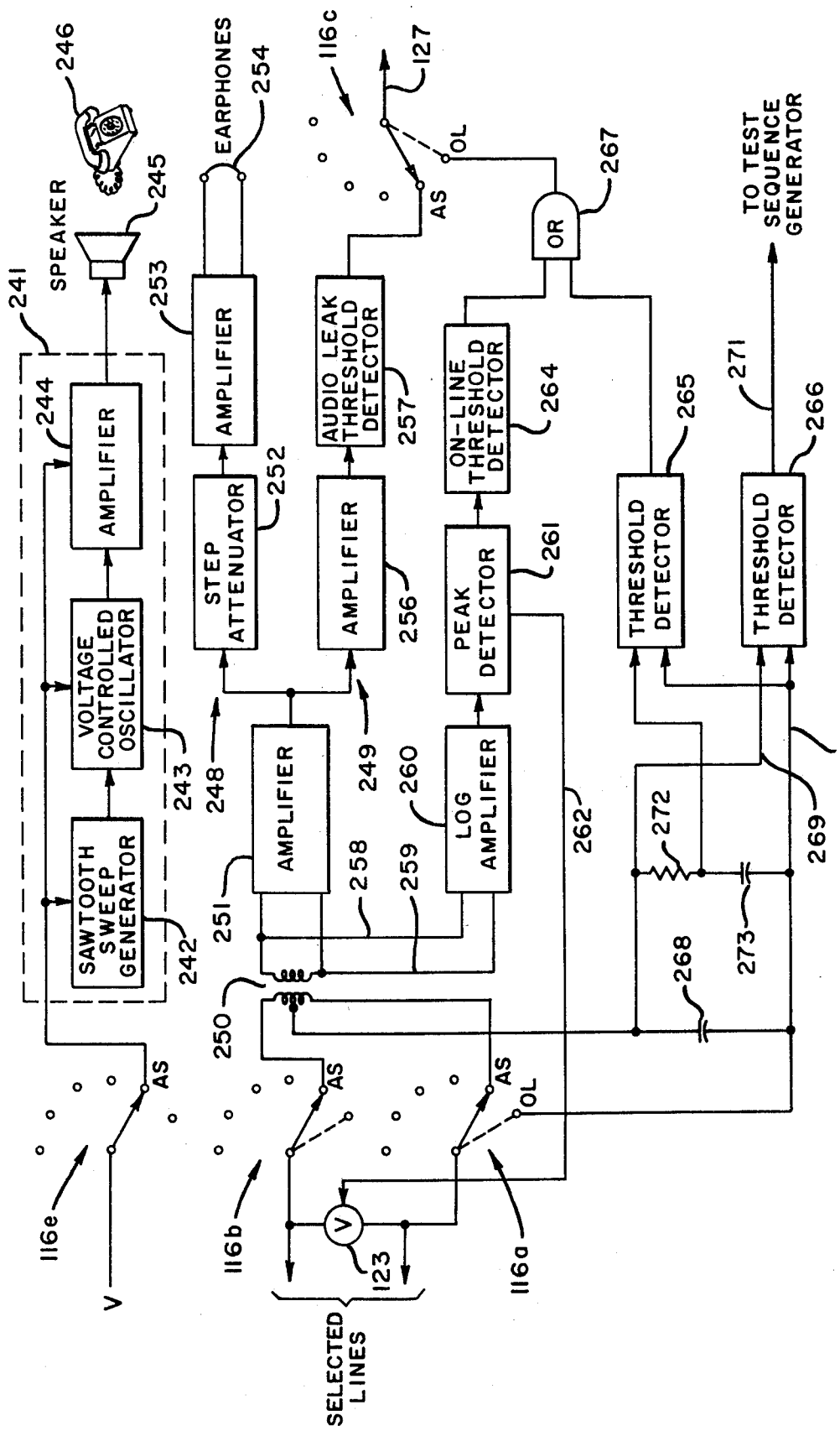
FIG. 9 is a schematic block diagram of the audio sweep and on-line test circuits.

Referring now to FIG. 9, source 241 of audio signals comprises sawtooth sweep generator 242, voltage controlled oscillator 243, and amplifier 244. Generator 242 produces a sawtooth sweep voltage varying at a rate of 100 Hz. This sweep voltage is applied to the voltage controlled oscillator for biasing it to oscillate at frequencies between 300 Hz and 3 kHz. Thus, during any 10-millisecond time interval, the output of oscillator 243 contains all frequencies between 300 Hz and 3 kHz. When the test selector switch is in the audio sweep (AS) position, voltage source V is connected through switch 116e to energize source 241. The audio signal from source 241 is applied to loudspeaker 245. During the audio sweep test, loudspeaker 245 is placed a few inches behind and facing the rear of the subscriber set 246 under test.

The audio sweep test circuit 114 (see FIG. 9) comprises audio listening circuit 248, audio threshold detection circuit 249, and transformer 250. The primary winding of the transformer is connected through test selector switches 116a and 116b to the selected lines. The secondary winding of the transformer is coupled through amplifier 251 to listening circuit 248 and threshold circuit 249. The listening circuit comprises step attenuator 252, amplifier 253, and earphones 254. The step attenuator provides a mechanism for adjusting the level of audio signals in the listening circuit when the earphones are used to monitor audio signals on the selected lines. Audio threshold detection circuit 249 comprises amplifier 256 and audio leak threshold detector 257. The output of detector 257 is the output of test circuit 114 that is coupled through test selector switch 116c and applied on line 127 to the inhibit circuit. The secondary winding of transformer 250 is also connected on lines 258 and 259 to logarithmic amplifier 260. The output of the log amplifier is detected by peak detector 261 and applied on line 262 to the voltmeter 123 that is connected across the selected lines. When the voltmeter is in the DB position, it provides an indication of the power level of audio signals on the selected lines.

When the test selector switches are in the on-line (OL) position (the dashed position in FIG. 9), the on-line test circuit 115 is connected through the primary winding of transformer 250 and switches 116a and 116b to the selected lines. Test circuit 115 comprises amplifier 260, peak detector 261, on-line threshold detector 264, threshold detectors 265 and 266 and OR gate 267. Capacitor 268 is connected across the selected lines and on lines 269 and 270 across the inputs of detector 266. The output of detector 266 on line 271 is a control signal that controls the operation of the test sequence generator during the on-line test.

Resistor 272 and capacitors 268 and 273 comprise a two-pole RC filter that is connected across the selected lines and the inputs of threshold detector 265. The output of detector 265 is applied to OR gate 267. The output of detector 264 is also applied to OR gate 267. The output of OR gate 267 is the output of test circuit 115 that is coupled through switch 116c and applied on line 127 to the inhibit circuit.

When the test set is operated in the automatic mode, operations performed by the analyzer are: (1) select a pair of lines for test; (2) provide a time delay for connecting the selected lines to the set (and damping of transients on the selected lines); (3) perform a test on the selected lines; (4) enable the inhibit logic to read the status of the selected lines; and (5) if an abnormal condition does not exist on the selected lines, repeat the above at the end of each test. Test sequence generator 133 determines the time sequence in which these operations are performed. The test sequence generator is responsive to the output of clock 148 for producing different time delays, an interrogate pulse and an end-of-test pulse.

The test selector switches determine which test is to be performed on the selected lines. The high voltage and audio sweep tests are performed on all pairs of selected lines. The high voltage test is actually performed on every pair of selected lines twice.

If, after a first test, the high voltage test circuit does not indicate that the selected lines contain a short or fault, the connection of the test circuit to the selected lines is automatically reversed and the selected lines are tested a second time before the counters are advanced. Although the ringer search test may be performed on all pairs of selected lines, it is only necessary to perform this test on the selected lines which are indicated during the high voltage test as containing a fault. The capacitor breakdown test is performed only on the selected lines indicated during the ringer search test as containing the ringer circuit. If it is desirable to determine whether another subscriber set is in use and connected through the subscriber set to be tested before the latter is disconnected from the connection block, the wires of cable 68c may be connected to the contacts of the connection block, in parallel with the lines of the mounting cord, as shown in FIG. 1. The on-line test is then performed to determine whether an associated subscriber set is in use.

When it is desirable to test a subscriber set to determine whether it operates as a clandestine listening device, the mounting cord is disconnected from the connection block 6 or plug assembly 9 and connected through cables 68 to the scanner. When the test set is turned on, scan selector switch 96 is positioned to operate the set in the desired scan sequence (A—A or A–B scan) and reset switch 199 is actuated to reset the counters. Test selector switch 116 is then switched to the HV-S (high voltage test with short circuit indication) position to connect high voltage test circuit 111 to the outputs of the scanner. If the test set is operated in the automatic mode with the test selector switch in the HV (high voltage test without short circuit indication) position, the test set will not revert to the manual mode and indicate the status of the lines when the selected lines are short-circuited.

The high voltage test is employed to detect whether a subscriber set has been modified by connecting breakdown devices, passive networks, or conductors between any pair of lines of the mounting cord. The high voltage test circuit detects and indicates which of three possible conditions exists on the selected lines: (1) an open circuit, indicating that the subscriber set has not been modified; (2) a short circuit, which may be a proper connection in the subscriber set; and (3) an intermediate impedance.

The test set is caused to operate in the automatic mode to automatically select and test each pair of lines by actuating mode select switch 185. The output of the mode control logic on line 189 biases the control logic to operate in the automatic mode and advance the counters to connect a pair of lines to the scanner outputs on lines 70 and 71. Simultaneously, the output of the mode logic on line 192 energizes the standby relay to connect the scanner outputs to test circuit 111. The output of the mode logic on line 194 biases test sequence generator 133 to test the selected lines connected to the high voltage test circuit.

At time $t_1$, generator 133 produces a 5-millisecond relay operate pulse 276 (FIG. 10a) on line 172 that is inverted and applied to transistor 209 and multivibrator 210. This pulse saturates transistor 209 and effectively disconnects current generator 203 from the selected lines so that the line voltage is zero during selection of the lines. At time $t_2$, transistor 209 is again cutoff and current generator 203 is connected to the selected lines. Simultaneously, the trailing edge of pulse 276 causes the test sequence generator to generate a 10-millisecond timing pulse 277 (FIG. 10b). The trailing edge of pulse 276 at time $t_2$ also triggers one shot multivibrator 210 to produce a 3-millisecond pulse 278 (FIG. 10c) which is applied to voltage source 126.

Pulse 278 causes the voltage source to produce a high voltage pulse on line 124. This pulse voltage is sufficient to breakdown and cause conduction of a neon lamp or several 4-layer diodes connected in series. After a breakdown device connected across the selected lines is caused to conduct and the pulse voltage is removed from the selected lines, current from generator 203 sustains the device in its low impedance conduction state. If the selected lines are open-circuited, current generator 203 will supply a 600-volt base voltage on the lines when the pulse voltage is removed.

The voltage across and current on the selected lines are represented by FIGS. 10f and 10g, respectively. The operation of detectors 201 and 202 and AND gate 216 for indicating whether the selected lines are open-circuited, short-circuited, or are shunted by an intermediate impedance is summarized in TABLES 4A and 4B.

If the selected lines are open-circuited, no current will flow on the selected lines, waveform 279, FIG. 10g, time $t_2$ to $t_5$ and the voltage developed across the lines is the applied voltage, waveform 280, FIG. 10f, time $t_2$ to $t_5$. The current applied to the current detector is less than the threshold $I_{th}$ and detector 202 therefore conducts to produce a negative output indicating that the selected lines are open-circuited (TABLE 4A, row 4). Since this line voltage is greater than the threshold $V_{th}$, the output of detector 201 on line 128 is positive indicating that the selected lines are not short-circuited (TABLE 4A, row 2). These outputs of detectors 201 and 202 are inverted and applied to AND gate 216 (TABLE 4B, rows 3 and 4) which produces a positive output on line 127 indicating that a fault does not exist on the selected lines.

If the selected lines are short-circuited, sources 126 and 203 are loaded so that the voltage across the selected lines is zero, waveform 281, FIG. 10f, and the current on the lines increases to a high value, waveform 282, FIG. 10g. Since this line voltage is less than the threshold $V_{th}$, the output of detector 201 is negative indicating that the lines are short-circuited (row 1, FIG. 4A). Since the current on the lines is greater than the threshold $I_{th}$, the output of detector 202 is positive indicating that the selected lines are not open-circuited (row 3, TABLE 4A). These outputs of detectors 201 and 202 are also inverted and applied to AND gate 216 (TABLE 4B, rows 5 and 6) which again produces a positive output on line 127 indicating that a fault does not exist on the selected lines.

If the selected lines are neither short-circuited nor open-circuited, an impedance of some intermediate value must be connected across the selected lines. The voltage across these selected lines will decay to some intermediate value, waveform 284, FIG. 10f, and a nominal current, waveform 285, FIG. 10g, will flow on the selected lines. Since the resultant voltage (FIG. 10f, time $t_7$ to $t_9$) on the lines is greater than the threshold $V_{th}$, the output of detector 201 is positive indicating that the lines are not short-circuited (TABLE 4A, row 2). Since the current (FIG. 10g, time $t_7$ to $t_9$, is also greater than the threshold $I_{th}$, the output of detector 202 is also positive indicating that the selected lines are not open-circuited (TABLE 4A, row 3). These outputs of detectors 201 and 202 are also inverted and applied to AND gate 216 (TABLE 4B, rows 7 and 8) to cause the AND gate to conduct to produce a negative output on line 127 indicating that a fault exists on the selected lines.

The 10-millisecond timing pulse 277 (FIG. 10b) provides a time delay during which the voltage pulse is applied to the selected lines and the voltage and current on the lines stabilize. At time $t_4$, the trailing edge of pulse 277 causes the test sequence generator to produce an interrogate pulse 286 (FIG. 10d) which is applied on line 179 to the inhibit circuit. The interrogate pulse 286 enables the inhibit circuit to read the status of the selected lines between times $t_4$ and $t_5$. If the outputs of the high voltage test circuit on lines 127 and 128 are both positive (FIG. 10h, time $t_4$ to $t_5$), indicating that neither a fault nor a short circuit exists on the selected lines, the output of the inhibit circuit on lines 176 and 177 have no effect on the operation of the counter logic. At the end of the test at time $t_5$, the trailing edge of pulse 286 causes the test sequence generator to produce a control pulse on line 288 and an end of test pulse 287 (FIG. 10e) on line 171. The control pulse on line 288 biases the polarity relay logic 134 to produce an output on line 289 which energizes polarity relay 118 to reverse the connection of the selected lines to the high voltage test circuit. The high voltage test is again performed on the same pair of selected lines in order to detect all possible connections of breakdown devices across the selected lines.

After the test signals are applied to the selected lines the second time, interrogate pulse 286' (FIG. 10d) enables the inhibit circuit to again read the status of the selected lines. If the outputs of test circuit 111 on lines 127 and 128 are still positive, again indicating that neither a fault nor a short circuit is on the selected lines, the output of the inhibit circuit on lines 176 and 177 have no effect on the operation of the counter logic. The end of test pulse 287' on line 171 at time $t_9$ then biases the counter control logic to advance the counters to connect a new pair of selected lines to circuit 111 for test. This operation continues until all pairs of lines are tested or until a fault or short circuit is detected on the selected lines.

If the output of the high voltage test circuit on line 128 is negative (FIG. 10h, time $t_8$ to $t_9$) during interrogation of the selected lines, the output of the inhibit circuit on line 177 baises the counter control logic to refrain from advancing the counters and to produce an output on lines 190 and 190' which cause the test sequence generator to stop the test and the mode control logic to operate the test set in the manual mode. Lamp 177' lights to indicate that the selected lines are short-circuited. The operator must then determine whether the short circuit on the selected lines is authorized or whether in fact a fault exists on the selected lines.

If the output of the high voltage test circuit on line 127 is negative (FIG. 10h, time $t_8$ to $t_9$) during interrogation of the selected lines, the output of the inhibit circuit logic on line 176 also biases counter logic 131 to refrain from advancing the counters and to produce outputs on lines 190 and 190' which cause the test sequence generator to stop the test and the mode control logic to operate the test set in the manual mode. Lamp 176' lights to indicate that a fault exists on the selected lines. It must now be determined whether a fault actually exists on the lines or whether in fact the ringer circuit is connected to the lines. This may be accomplished by manually advancing the test select switch 116 to the RS (ringer search test) position and performing the ringer search test on the selected lines.

The essence of the high voltage test is to measure the impedance across the selected lines after the high voltage pulse is applied to cause conduction of any breakdown device connected across the lines, but while a holding current is provided by the current generator to hold the breakdown device in the conduction state. If the impedance across the lines is less than a lower limit (10 ohms), a first measuring circuit produces an output indicating that the lines are short-circuited. Conversely, the output of the first measuring circuit indicates that the impedance across the lines is other than a short circuit if the impedance is greater than the lower limit. If the impedance across the lines is greater than an upper limit (1 meg ohm), the output of a second measuring circuit indicates that the lines are open-circuited. Conversely, the output of the second measuring circuit indicates that the impedance across the lines is other than an open circuit if the impedance is less than the upper limit. If the output of the first measuring circuit indicates that the lines are not short-circuited and the output of the second measuring circuit indicates that the lines are not open-circuited, the output of a circuit combining the outputs of the first and second measuring circuits indicates that some circuit, such as a breakdown device or the ringer circuit, is connected across the lines. The detectors 201 and 202 comprise the first and second measuring circuits, respectively. The inverters 215 and 217 and AND gate 206 comprise the combining circuit.

If a breakdown device such as a 4-layer diode is connected across the selected lines, it will appear as an open circuit across the lines when the high voltage breakdown voltage is not present on the lines. Thus, the selected lines previously indicated by the high voltage test circuit as containing a fault can only present two impedances, an open circuit or an intermediate impedance, to oscillator 221 (FIG. 7). If the selected lines present an open circuit to oscillator 221, a fault exists on the selected lines. If the selected lines present an intermediate impedance (not a short and not an open circuit) to oscillator 221, the ringer circuit is connected to the selected lines. Since the ringer search test circuit may be operated independently of the high voltage test circuit, test circuit 112 also includes circuitry for discriminating against a short circuit on the selected lines.

The test set is caused to operate in the manual mode to test only the one pair of selected lines by actuating mode select switch 184. The output of the mode control logic on line 188 biases the counter logic to hold the count stored by the counters and thus to again connect the selected lines to the scanner outputs. The output of the mode logic on line 192 again energizes the standby relay to connect the scanner outputs to test circuit 112. Simultaneously, the output of the mode control logic on line 194 biases the test sequence generator to test the selected lines.

The operation of the ringer search test circuit for indicating whether the ringer circuit is connected to the selected lines is summarized in TABLE 5.

At time $t_1$, generator 133 produces a 5-millisecond relay operate pulse 291 (FIG. 11a) on line 172 which is coupled through inverter 230 to reset multivibrators 224 and 225. This causes OR gate 226 to produce a positive output on line 127 indicating that the ringer circuit is not connected to the selected lines (row 1, TABLE 5). The output of oscillator 221 is applied to detectors 222 and 223 and the selected lines (FIG. 11e) when mode select switch 184 is actuated at time $t_1$. The trailing edge of pulse 291 at time $t_2$ causes generator 133 to produce a 50-millisecond timing pulse 292 (FIG. 11b).

Figure 11:
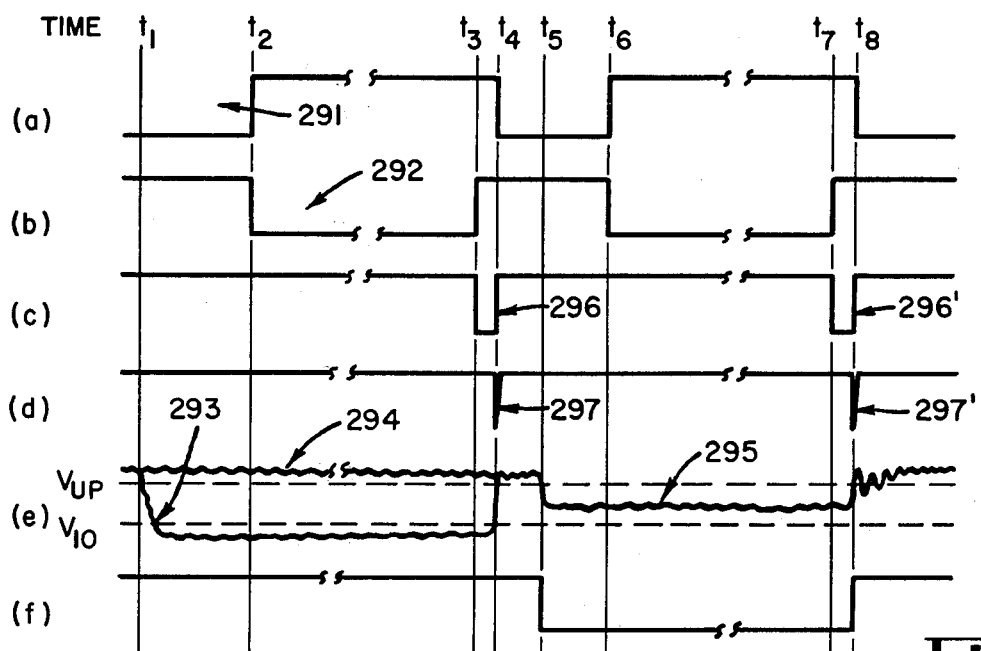

If the selected lines are short-circuited, the output of oscillator 221 and the line voltage immediately falls to zero (FIG. 11e, waveform 293). Since this line voltage is less than the lower and upper thresholds $V_{10}$ and $V_{UP}$ (FIG. 11e), threshold circuits 222 and 223 are both nonconducting (row 2, TABLE 5). Thus, the output of OR gate 226 is still positive indicating that the ringer circuit is not connected to the selected lines.

If the selected lines are open-circuited, the output of oscillator 221 and the line voltage remain at a peak value (FIG. 11e, waveform 294). Since this line voltage is greater than the upper and lower thresholds $V_{UP}$ and $V_{10}$, threshold circuits 222 and 223 both conduct (TABLE 5, row 3). Thus, OR gate 226 is again biased to produce a positive output indicating that the ringer circuit is not connected to the selected lines.

If the ringer circuit is connected across the selected lines, the output of oscillator 221 and the line voltage decays to an intermediate value (FIG. 11e, waveform 295). This voltage is greater than the lower threshold $V_{10}$, but is less than the upper threshold $V^{UP}$. Thus, only the lower threshold circuit 223 is caused to conduct (TABLE 5, row 4) to bias OR gate 226 to conduct to produce a negative output on line 127 indicating that the ringer circuit is connected to the selected lines.

The 50-millisecond timing pulse 292 provides a time delay for the signal on the selected lines to stabilize. At time $t_3$, the trailing edge of pulse 292 causes generator 133 to produce an interrogate pulse 296 (FIG. 11c). The interrogate pulse is applied on line 179 to enable the inhibit circuit to read the status of the selected lines between time $t_3$ and $t_4$. If the selected lines are short-circuited or open-circuited (FIG. 11e, waveforms 293 and 294, respectively), the output of test circuit 112 on line 127 is positive (FIG. 11f, time $t_3$ to $t_4$) during interrogation indicating that the selected lines do not contain the ringer circuit. The output of the inhibit circuit on line 178 therefore has no effect on the operation of the test set. This means that there actually is a fault on the selected lines. Since the test set is operating in the manual mode, the end of test pulse 297 (FIG. 11d) has no effect on operation of the counter logic.

Line polarity switch 298 is then actuated to cause the polarity logic to change the state of relay 118 and thus to reverse the polarity of the selected lines. The ringer search test is again performed on the same pair of lines by actuating mode control switch 184. At time $t_7$, interrogation pulse 296' enables the inhibit circuit to again read the status of the selected lines. If the ringer circuit is connected to the selected lines (FIG. 11e, waveform 295), the output of test circuit 112 on line 127 is negative (FIG. 11f, time $t_7$ to $t_8$) during interrogation. The output of the inhibit circuit on line 178 therefore lights lamp 178' to indicate that the selected lines contain the ringer circuit.

If the test set is operated in the automatic mode during the ringer search test, the sequence of operations is similar to that of the high voltage test. Specifically, at the first (297) of a pair (297, 297') of end-of-test pulses, the test sequence generator automatically causes the polarity logic to reverse the connection of the selected lines to test circuit 112 if the inhibit circuit output on line 178 indicates that the ringer circuit is not connected to the selected lines. The second (297') end-of-test pulse causes the counter logic to automatically advance the counters to connect a new pair of selected lines to the analyzer if the inhibit circuit output on line 178 again indicates that the ringer circuit is not connected to the selected lines.

The essence of the ringer search test is to measure the impedance across the selected lines at the frequency of the output of a ringer search oscillator. The output of the oscillator causes the ringer circuit in the subscriber set to be resonant at this frequency and thus to present a low impedance to measurement circuitry connected across the selected lines. Neither a high voltage pulse nor a holding current are applied to the lines to cause and maintain conduction of breakdown devices on the lines. Thus, such a device would appear as an open circuit across the lines. Thus, if the high voltage test has already been performed on the lines, an indication during the ringer search test that the lines are open-circuited means that a breakdown device is connected across the lines. If the impedance across the lines is less than a lower limit, a first measuring circuit produces an output indicating that the lines are short-circuited. Conversely, the output of the first measuring circuit indicates that the impedance across the lines is other than a short circuit if the impedance is greater than the lower limit. If the impedance across the lines is greater than an upper limit, the output of a second measuring circuit indicates that the lines are open-circuited. Conversely, the output of the second measuring circuit indicates that the impedance across the lines is other than an open circuit if the impedance is less than the upper limit. If the output of the first measuring circuit indicates tht the lines are not short-circuited and the output of the second measuring circuit indicates that the lines are not open-circuited, the output of a circuit combining the outputs of the first and second measuring circuits indicates that the ringer circuit is connected across the lines. The threshold circuits 222 and 223 comprise the first and second measuring circuits, respectively. The inverter 229, multivibrators 224 and 225, and OR gate 226 comprise the combining circuit.

When the ringer search test circuit detects that the ringer circuit is connected to the selected lines, test selector switch 116 is manually advanced to the CB (capacitor breakdown test) position. The ringer circuit is then tested in the manual mode to determine whether the ringer capacitor has been modified or replaced to facilitate modification of the subscriber set.

Mode select switch 185 is actuated to energize the test set. The position of tap 236 of potentiometer 234 is then slowly varied until the 600-volt supply voltage from source 235 is connected across the selected lines (FIG. 8). The voltage across and current on the selected lines is monitored during application of the supply voltage to the lines by observing meters 117 and 123. Breakdown of the ringer capacitor is indicated by a decrease in the line voltage or current flow in the lines. If the breakdown of the ringer capacitor does not occur, the ringer capacitor is assumed to be correct. After the voltage on the selected lines is reduced to zero, the lines are reversed by actuating line polarity switch 298 and the test is again repeated on the same pair of selected lines. If breakdown of the ringer capacitor occurs, the subscriber set is assumed to have been modified by repackaging or replacing the ringer capacitor.

After the high voltage and ringer circuit tests are performed on the selected lines, the test selector switch 116 is advanced to the AS (audio sweep test) position. The purpose of the audio sweep test is to determine whether acoustical energy is converted to electrical energy on selected lines of the mounting cord by some type of clandestine listening device located in the subscriber set. This test consists of illuminating the subscriber set 246 under test with an audio signal from loudspeaker 245 and sequentially examining each pair of selected lines in the mounting cord of the subscriber set.

When the test selector switch is connected to the AS (audio sweep test) position, source 241 is energized to illuminate the subscriber set with an audio signal whose frequency varies from 300 Hz to 3 kHz at a 100 Hz rate. No timing signals are applied to source 141. The test set is caused to operate in the automatic mode by actuating mode select switch 185. This causes the output of the mode control logic on line 192 to energize the standby relay to connect the scanner outputs to test circuit 114. If an audio signal is not coupled to the lines, the signal on the lines is zero (waveform 301, FIG. 12e). If the audio signal is coupled to the selected lines, the magnitude of the signal gradually increases to a steady state value, (waveform 302, FIG. 12e). The audio signal is coupled through transformer 250 and amplifier 251 to detector 257 and through circuit 248 to the earphones 254.

Actuating switch 185 also causes the output of the mode control logic on line 189 to bias the counter logic to operate in the automatic mode and advance the counters to connect a pair of selected lines to test circuit 114. Simultaneously, the output of the mode control logic on line 194 biases the test sequence generator to start the test. The 5-millisecond relay operate pulse 304 (FIG. 12a) and 10-millisecond timing pulse 305 (FIG. 12b) provide a time delay during which voltage and current on the selected lines stabilize. At time $t_3$, the trailing edge of pulse 305 causes the test sequence generator to produce an interrogate pulse 306 (FIG. 12c) which enables the interrogate circuit to read the status of the lines between time $t_3$ and $t_4$.

If the line voltage is less than the threshold $V_{TH}$ (FIG. 12e, time $t_3$ to $t_4$), the output of test circuit 114 on line 127 is positive (FIG. 12f, time $t_3$ to $t_4$) indicating that the audio signal is not coupled to the selected lines. The output of the inhibit circuit on line 176 therefore has no effect on the operation of the counter logic. At time $t_4$, the trailing edge of pulse 306 causes the test sequence generator to produce an end of test pulse 307 on line 171 which biases the counter logic to advance the counters to connect a new pair of selected lines to circuit 114 for test.

If the line voltage is greater than the threshold $V_{TH}$ (FIG. 12e, waveform 302) when interrogate pulse 306' (FIG. 12d, time $t_7$ to $t_8$) enables the inhibit circuit, the output of test circuit 114 on line 127 is negative (FIG. 12f, time $t_7$ to $t_8$) indicating that the audio signal is coupled to the selected lines. The output of the inhibit circuit on line 176 biases the counter logic to refrain from advancing the counters and to produce an output on lines 190 and 190' which causes the test sequence generator to stop the test and the mode control logic to operate the test set in the manual mode. Lamp 176' lights to indicate that a fault is associated with the selected lines. The operator can verify that an audio signal actually exists on the lines by observing the indication on the voltmeter and listening to the signals coupled to earphones 254. The test set will not again operate in the automatic mode until mode select switch 185 is actuated by the operator.

The on-line test may be used to determine whether another subscriber set is in use and connected through the subscriber set to be tested before the latter is disconnected from the connection block. This condition is found by detecting the presence of either an audio signal or a DC voltage on the selected lines. During this test, the subscriber set remains connected to the terminals of the connection block and individual wires of the cable 68c from the scanner are connected in parallel with existing connections as indicated in FIG. 1.

In this test, the test selector switch is in the on-line test position as indicated by the broken lines in FIG. 9. During this test, the test set is caused to operate in the automatic mode as described above by actuating mode select switch 185. If an audio signal is coupled to the selected lines under test, it is coupled through transformer 250 and is detected by detector 264. If the magnitude of the audio signal on the selected lines exceeds the threshold level of the on-line detector during interrogation of the lines caused by interrogation pulse 314, the detector 264 and OR gate 267 conduct to produce a negative output on line 127.

This output of the inhibit circuit on line 176 biases the control logic to stop the test and light lamp 176' to indicate a fault on the selected lines. This indication means that an associated subscriber set is in operation through the subscriber set under test.

Detection of a DC voltage on the selected lines is accomplished by the RC filter and detectors 265 and 266. When the selected lines are initially switched to the on-line test circuit, capacitor 268 short-circuits AC components on the line. If capacitor 268 does not charge up to a DC voltage greater than the threshold level $V_{SHORT}$ (FIG. 13g) of detector 266 within the time interval dictated by timing pulses 311 and 312 (FIGS. 13a and 13b, time $t_1$ to $t_4$), which are generated by the test sequence generator, interrogate pulse 314 (FIG. 13c) from the test sequence generator enables the inhibit logic to read the status of the selected lines. If the output on line 127 does not indicate a fault on the selected lines, the end of test pulse 315 (FIG. 13e) biases the counter logic to advance the counters to connect a new pair of lines to the test circuit.

Figure 13:
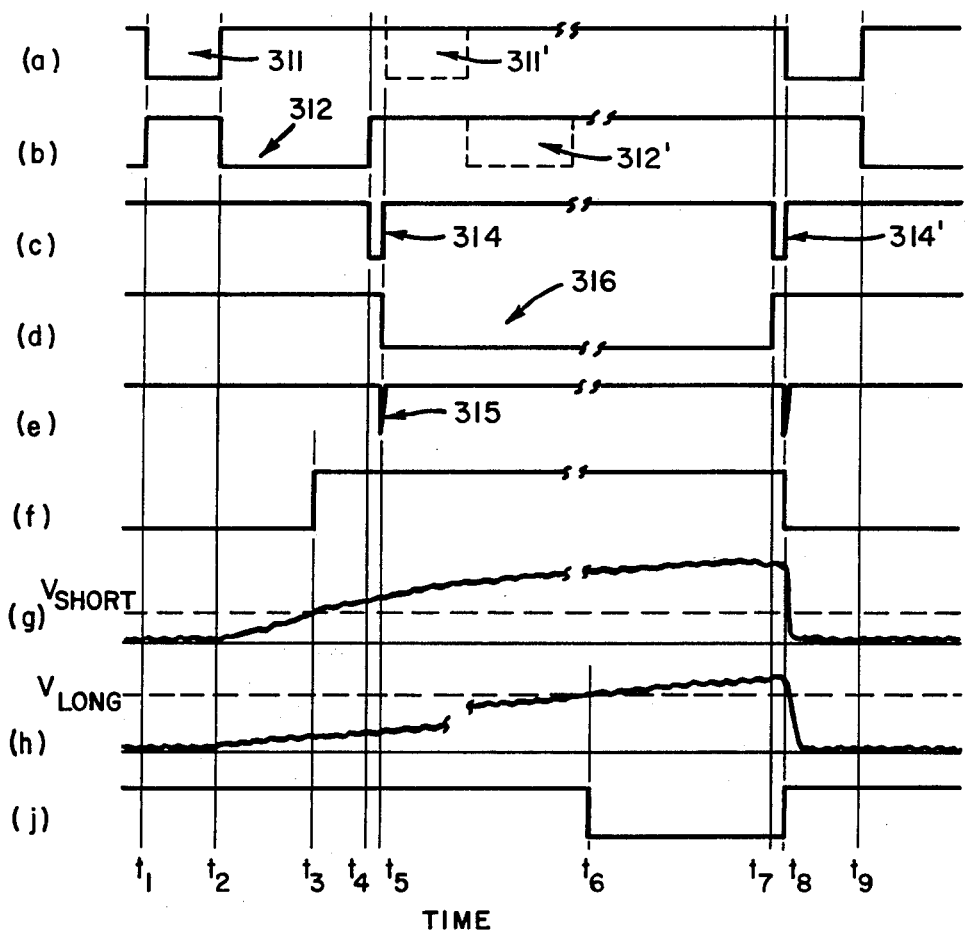

If the DC voltage on capacitor 268 exceeds the threshold level $V_{SHORT}$ of detector 266 (FIG. 13g, time $t_4$), however, the detector 266 is caused to conduct to produce an output on line 271 which is applied to the test sequence generator. This output of detector 266 inhibits generation of the end of test pulse 315 and causes the test sequence generator to produce a 400-millisecond delay pulse 316 (FIG. 13d). During the time interval determined by pulse 316, capacitor 273 charges toward the DC voltage on the selected lines. If the voltage on capacitor 273 exceeds the threshold $V_{LONG}$ (FIG. 13h, time $t_6$), detector 265 and OR gate 267 conduct to produce a negative output on line 127. Thus, when interrogation pulse 314' (FIG. 13c) enables the inhibit logic to read the status of the selected lines, the output of the inhibit circuit on line 176 biases the counter control logic to stop the test and light lamp 176' to indicate that the selected lines identified by indicators 146 and 147 contain a fault. This indication means that an associated subscriber set is in operation through the subscriber set to be tested.

Although this invention has been described in relation to a preferred embodiment thereof, modifications thereof will be apparent to those skilled in the art. The scope of this invention is therefore to be determined from the appended claims rather than from the above detailed description.

What is claimed is:

1. The method of analyzing the plurality of lines in the mounting cord of a communications instrumentality for determining whether or not certain circuitry is coupled to one or more pairs of said lines, consisting of the steps of selecting a pair of said lines, conditioning said pair of lines by illuminating the instrumentality with an acoustical signal such that the coupling of said certain circuitry thereto or absence of such coupling is indicated by the electrical parameters of said pair of lines, measuring said electrical parameters and indicating the presence or absence of said coupled circuitry, and selecting a different pair of said lines for such conditioning when said electrical parameters indicate the absence of said coupled circuitry.

2. The method of analyzing the plurality of lines in the mounting cord of a communications instrumentality for determining whether or not certain circuitry is coupled to one or more pairs of said lines consisting of the steps of selecting a pair of said lines, conditioning said pair of lines in such a manner that the coupling of said certain circuitry thereto or absence of such coupling is indicated by the electrical parameters of said pair of lines, said conditioning including the steps of applying to said pair of lines a voltage pulse of limited duration and of sufficient magnitude to cause conduction of an electric current in said certain circuitry, if any, and applying a holding signal to said pair of lines during the duration of said voltage pulse whereby to maintain said conduction if any after cessation of the voltage pulse, measuring said electrical parameters and indicating the presence or absence of said coupled circuitry, and selecting a different pair of said lines for such conditioning when said electrical parameters indicate the absence of said coupled circuitry.

3. The method according to claim 2 in which said measuring consists of establishing upper and lower limits of impedance of said pair of lines representative of the coupling thereto of said certain circuitry, indicating whether the actual impedance of said pair of lines is within or without said limits whereby to determine that said certain circuitry is or is not coupled, respectively, to the pair of lines.

4. Apparatus for determining whether certain circuitry is coupled across a pair of the plurality of lines contained in the mounting cord of a communication instrument, comprising means for sequentially pairing each of the lines in said cord with every other line therein, means for performing test operations on each of said paired lines comprising a high voltage circuit connected to the lines paired by said pairing means and having a source of successive voltage pulses, each of said pulses having a predetermined width, a source of successive holding pulses, each of said holding pulses having a width greater than said predetermined width of the voltage pulses, a measuring circuit adapted to measure impedance and having predetermined upper and lower impedance limits, means for connecting the voltage pulse source and the holding pulse source and the measuring circuit to two of the paired lines whereby the voltage pulse initially conditions circuits associated with the paired lines for measurement of the impedance thereof by the measuring circuit during application of the holding pulse after cessation of the voltage pulse, said measuring circuit in a first operating state being responsive to measured impedances greater than said predetermined upper limit corresponding to an open-circuit condition and less than said predetermined lower limit corresponding to a short-circuit condition for indicating that said certain circuitry is not coupled to said paired lines and in a second operating state being responsive to measured impedance between said limits for indicating that said certain circuitry is coupled to said paired lines, said pairing means being responsive to said measuring circuit in said first operating state for connecting a different pair of said plurality of lines in the mounting cord to the high voltage circuit.

5. Apparatus for detecting a transducer connected across a pair of the plurality of lines contained in the mounting cord of a subscriber telephone set, comprising means for illuminating the exterior of the said telephone set with an audio signal, pairing means having a plurality of inputs connected to said lines, respectively, of the mounting cord and having a pair of outputs, said pairing means comprising switch means for connecting each of said input lines thereto with each other pairing means input line, and means operative on said switch means for sequentially connecting different pairs of said pairing means input lines to said pair of outputs, and a threshold circuit having a pair of inputs connected to the outputs of said pairing means and having an output, said threshold circuit being characterized by a first operating state in which audio signals on said output lines of the pairing means having an amplitude greater than a predetermined value produce an indication that a transducer is connected across the lines and a second operating state in which an audio signal on said pairing means output lines having an amplitude less than said predetermined value produces an indication that a transducer is not connected across the pair of lines, said pairing means being responsive to operation of said threshold circuit in the second state for connecting a different pair of lines to the threshold circuit for test.

6. Apparatus for analyzing the plurality of lines contained in the mounting cord of a subscriber key telephone set and determining whether certain circuitry is connected across one or more pairs of said lines for converting said set into a clandestine audio surveillance device, comprising
- a scanner comprising
  - a pair of relay trees, each of said trees having an output line,
  - a pair of connector plugs, at least one of said plugs having terminals of some of the lines in said cord,
  - means for electrically connecting said plugs to said relay trees, respectively,
  - a scan selector circuit connected between said plugs and said trees for interchanging the electrical connection of at least one plug between said trees,
- a pair of counter circuits operatively connected to the relay trees, respectively, for controlling operation of said trees to connect pairs of said lines to the scanner outputs,
- a logic circuit operatively connected to said counter circuits for controlling operation of same,
- a test sequence generator operatively connected to said logic circuit,
- a mode control circuit operatively connected to said logic circuit and to said generator for selectively providing manual or automatic operation of same,
- a test circuit,
- a polarity relay
  - said polarity relay electrically connecting said test circuit to the scanner outputs, said polarity relay being responsive to an output of the test sequence generator for reversing the polarity of the connection of the scanner outputs to the test circuit,
- an inhibit circuit connected in series between the output of said test circuit and said logic circuit
  - said inhibit circuit being responsive to an output of said test sequence generator for applying the electrical output of said test circuit to said logic circuit,
- a pair of indicators connected to the outputs of said counters, respectively, for indicating which pair of said plurality of lines is being tested, and
- a third indicator responsive to the output of the inhibit circuit for indicating whether said certain circuitry is connected across the pair of lines.

7. Apparatus according to claim 6 wherein said test circuit comprises
- a high voltage source having outputs connected to said pair of lines,
- a multivibrator responsive to an output of the test sequence generator for controlling the operations of said high voltage source whereby a high voltage pulse having a predetermined width is produced as an output thereof,
- a current generator having outputs connected to said pair of lines,
- a voltage detector having a threshold level connected to said pair of lines for producing an output when the detected voltage on said lines exceeds said threshold level whereby to indicate whether the lines are short-circuited,
- a current detector having a threshold level connected in series with one of said pair of lines and producing an output when the detected current on said lines exceeds the current threshold level whereby to indicate whether said lines are open-circuited,
- a first inverter receiving the current detector output,
- a second inverter receiving the output of the voltage detector,
- an AND gate having first and second inputs receiving the outputs of the first and second inverters, respectively, and producing an output when said certain circuitry is connected across the said pair of lines.

8. Apparatus according to claim 7 including an electronic switch connected between said pair of lines and the output of said test sequence generator for discharging residual voltage on the lines after the high voltage test operation.

9. The apparatus according to claim 6 for locating the ringer circuit of said subscriber set wherein said test circuit comprises
- an upper threshold circuit,
- a lower threshold circuit,
- an oscillator having an output connected to the inputs of said threshold circuits and to said pair of lines,
- first and second multivibrators responsive to the output of said test sequence generator for initially resetting said multivibrator in a first operating state,
- said multivibrators also being responsive to the outputs, respectively, of said threshold circuits,
- an OR gate having first and second inputs responsive to the outputs, respectively, of said multivibrators and producing an output indicating that said ringer circuit is connected to said pair of lines.

10. Apparatus according to claim 6 for testing the capacitor of the ringer circuit wherein said test circuit comprises
- a variable voltage source having a first output line connected to one of said pair of lines and having a second output line,
- a voltage indicator connected across said pair of lines, and
- a current indicator connected in series with the other one of said pair of lines and said second output line of said voltage source.

* * * * *